(12) United States Patent
Hana et al.

(10) Patent No.: US 11,679,672 B2
(45) Date of Patent: Jun. 20, 2023

(54) WORK VEHICLE AND POWER TAKE-OFF APPARATUS FOR THE SAME

(71) Applicant: KUBOTA CORPORATION, Osaka (JP)

(72) Inventors: Hidetoshi Hana, Osaka (JP); Tomoya Uno, Osaka (JP); Katsuhiko Honda, Osaka (JP); Yusuke Shimogami, Osaka (JP); Yutaka Inubushi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 271 days.

(21) Appl. No.: 17/062,979

(22) Filed: Oct. 5, 2020

(65) Prior Publication Data

US 2021/0178895 A1 Jun. 17, 2021

(30) Foreign Application Priority Data

Dec. 17, 2019 (JP) .............................. JP2019-227656
Dec. 17, 2019 (JP) .............................. JP2019-227657
Dec. 17, 2019 (JP) .............................. JP2019-227658

(51) Int. Cl.
  *B60K 17/04* (2006.01)
  *B60K 17/28* (2006.01)
  (Continued)

(52) U.S. Cl.
  CPC ............ *B60K 17/28* (2013.01); *B60K 17/046* (2013.01); *F16H 3/093* (2013.01); *F16H 37/041* (2013.01);
  (Continued)

(58) Field of Classification Search
  CPC ...... B60K 17/28; B60K 17/046; B60K 17/34; F16H 3/093; F16H 37/041; F16H 2200/0004; F16H 2200/0043; F16H 2702/02; F16H 2037/044; F16H 2037/045; F16H 2037/049; F16H 37/043; F16H 48/06; F16H 48/22; F16H 2048/201;
  (Continued)

(56) References Cited

U.S. PATENT DOCUMENTS 4,292,855 A    10/1981   Murayama
2015/0128736 A1    5/2015   Hedman
(Continued)

FOREIGN PATENT DOCUMENTS

CN    110520651 A    11/2019
DE    102019204015 A1 * 10/2020 ........... B60B 35/125
(Continued)

OTHER PUBLICATIONS

European Search Report issued in European Patent Application No. 20200603.7 dated Mar. 26, 2021.
(Continued)

*Primary Examiner* — Justin Holmes
(74) *Attorney, Agent, or Firm* — Greenblum & Bernstein, P.L.C.

(57) ABSTRACT

A work vehicle is provided with a support member that supports an output shaft of a wheel differential mechanism between a differential case and a planetary reduction mechanism. The support member is configured to engage the output shaft relatively immovably in a direction along the axis of the output shaft.

3 Claims, 11 Drawing Sheets

(51) Int. Cl.
  *F16H 3/093* (2006.01)
  *F16H 37/04* (2006.01)
  *B60T 1/06* (2006.01)
  *B62D 49/06* (2006.01)

(52) U.S. Cl.
  CPC ............... *B60T 1/065* (2013.01); *B62D 49/06* (2013.01); *F16H 2200/0004* (2013.01); *F16H 2200/0043* (2013.01); *F16H 2702/02* (2013.01)

(58) Field of Classification Search
  CPC ......... B60T 1/065; B60T 1/062; B62D 49/06; B60Y 2200/221; B60Y 2300/1888
  See application file for complete search history.

(56) References Cited

U.S. PATENT DOCUMENTS

| | | |
|---|---|---|
| 2016/0137048 A1 | 5/2016 | Zhu et al. |
| 2017/0219076 A1 | 8/2017 | Hashimoto |
| 2018/0290870 A1* | 10/2018 | Masuda ................... F16D 55/39 |
| 2018/0339549 A1* | 11/2018 | Masuda ................. F16D 65/186 |
| 2018/0372188 A1 | 12/2018 | Hana et al. |
| 2020/0309234 A1* | 10/2020 | Bauer .................. B60B 35/125 |
| 2021/0071740 A1 | 3/2021 | Hana et al. |

FOREIGN PATENT DOCUMENTS

| | | | |
|---|---|---|---|
| EP | 3144171 A1 * | 3/2017 | ........... B60K 17/046 |
| EP | 3 527 852 A1 | 8/2019 | |
| EP | 3 715 673 A1 | 9/2020 | |
| JP | 58-43624 B2 | 9/1983 | |
| JP | 6-286489 | 10/1994 | |
| JP | 10-203185 A | 8/1998 | |
| JP | 2013-188183 | 9/2013 | |
| JP | 2015-521725 | 7/2015 | |
| JP | 2016-84823 | 5/2016 | |
| JP | 2019-6209 | 1/2019 | |
| WO | WO-2018066316 A1 * | 4/2018 | ......... F16H 57/0423 |

OTHER PUBLICATIONS

Office Action issued in Corresponding JP Patent Application No. 2019-227658, dated Nov. 22, 2022, along with an English translation thereof.

Office Action Issued in Corresponding JP Patent Application No. 2019-227656, dated Dec. 6, 2022, along with an English translation thereof.

Office Action Issued in Corresponding JP Patent Application No. 2019-227657, dated Dec. 13, 2022, along with an English translation thereof.

* cited by examiner

WORK VEHICLE AND POWER TAKE-OFF APPARATUS FOR THE SAME

BACKGROUND OF THE INVENTION

1. Field of the Invention

The present invention relates to a work vehicle and a power take-off apparatus for the work vehicle.

2. Description of the Related Art

(1) First Related Art

There are work vehicles provided with a wheel differential mechanism, an axle that is located on a vehicle body lateral outer side of the wheel differential mechanism, a planetary reduction mechanism that is provided spanning the axle and an output shaft of the wheel differential mechanism and that downshifts the power of the output shaft and transmits resultant power to the axle, and a brake that has a friction plate latched to a region of the output axle between the planetary reduction mechanism and a differential case of the wheel differential mechanism and that applies friction braking force to the axle via the output shaft.

A tractor shown in JP H10-203185A is an example of this type of work vehicle. This tractor is provided with a rear wheel differential mechanism serving as the wheel differential mechanism, and with a handbrake serving as the brake.

In the above-mentioned work vehicle, generally, and the output shaft and a side gear of the wheel differential mechanism are coupled together in an interlocked manner by spline engagement, and the output shaft and a rotational member of the planetary reduction mechanism, such as a sun gear, are coupled together in an interlocked manner by spline engagement, and thus if the output shaft shifts in a direction along the axis of the output shaft relative to the wheel differential mechanism and to the planetary reduction mechanism as sometimes happens due to factors such as operating force acting on the friction plate when the brake is applied, the brake drags due to the friction plate moving with the output shaft, resulting in power loss in the drive of the running wheels. In view of this, a work vehicle that is improved in this respect is desired.

(2) Second Related Art

There are power take-off apparatuses for work vehicles that are capable of shifting the power of an input shaft to power having four different rotation speeds and taking off resultant power with a power take-off shaft.

For example, an apparatus illustrated in JP S58-043624B (or U.S. Pat. No. 4,292,855A corresponding thereto) is provided with a transmission shaft serving as the input shaft and a holder serving as the output shaft that is coupled in an interlocked manner to a power take-off shaft (PTO shaft). Four gears fixed to the transmission shaft, four idler gears freely fitted to the holder in a state of individually meshing with the four gears, and a link pin that alternatively interlocks the four idler gears with the holder. That is, the power of the transmission shaft is transmitted to the holder after being shifted to power having four different rotation speeds by four gear trains, and transmitted to the power take-off shaft from the holder.

In the case of the conventional configuration, four gear trains in which the gears are aligned in the direction along the axis of the output shaft is provided, thus increasing the size of a gear shift mechanism in the axial direction of the output shaft. In view of this, a power take-off apparatus that is improved in this respect is desired.

(3) Third Related Art

With work vehicles, even if the engine that is installed differs and the rotation speed of engine power that is input to the power take-off apparatus changes, a set rotation speed may need to be maintained instead of changing the rotation speed of the power take-off shaft for each of the four speed levels, due to circumstances specific to the apparatus to be driven. In this case, with a conventional power take-off apparatus, it is necessary to change the speed/transmission ratio of the four gear trains, thus requiring the provision of a large number of gears with different outer diameters. This also applies in the case of changing the rotation speed of the power take-off shaft for each of the four speed levels, although the rotation speed of engine power that is input does not change.

An apparatus having the configuration shown in FIG. 11 will now be considered, as a power take-off apparatus that enables the rotation speed of the power take-off shaft to be shifted through four steps.

That is, a first input shaft gear 151 and a second input shaft gear 152 are relatively rotatably supported by an input shaft 150, and a first output shaft gear 154 and a second output shaft gear 155 are relatively rotatably supported by an output shaft 153. A first relay transmission gear 156 and a second relay transmission gear 157 are provided to the first input shaft gear 151, between the input shaft 150 and the output shaft 153. When the first input shaft gear 151 is coupled in an interlocked manner to the input shaft 150 by an input shaft sleeve 158 and the first output shaft gear 154 is coupled in an interlocked manner to the output shaft 153 by an output shaft sleeve 159, the power of the input shaft 150 is transmitted to the output shaft 153 via the input shaft sleeve 158, the first input shaft gear 151, the first relay transmission gear 156, the second relay transmission gear 157, the first output shaft gear 154 and the output shaft sleeve 159, and transmitted to the power take-off shaft 160 from the output shaft 153. When the first input shaft gear 151 is coupled in an interlocked manner to the input shaft 150 by the input shaft sleeve 158 and the second output shaft gear 155 is coupled in an interlocked manner to the output shaft 153 by the output shaft sleeve 159, the power of the input shaft 150 is transmitted to the output shaft 153 via the input shaft sleeve 158, the first input shaft gear 151, the first relay transmission gear 156, the second relay transmission gear 157, the second output shaft gear 155 and the output shaft sleeve 159, and transmitted to the power take-off shaft 160 from the output shaft 153. When the second input shaft gear 152 is coupled in an interlocked manner to the input shaft 150 by the input shaft sleeve 158 and the first output shaft gear 154 is coupled in an interlocked manner to the output shaft 153 by the output shaft sleeve 159, the power of the input shaft 150 is transmitted to the output shaft 153 via the input shaft sleeve 158, the second input shaft gear 152, the first relay transmission gear 156, the second relay transmission gear 157, the first output shaft gear 154 and the output shaft sleeve 159, and transmitted to the power take-off shaft 160 from the output shaft 153. When the second input shaft gear 152 is coupled in an interlocked manner to the input shaft 150 by the input shaft sleeve 158 and the second output shaft gear 155 is coupled in an interlocked manner to the output shaft 153 by the output shaft sleeve 159, the power of the input shaft 150 is transmitted to the output shaft 153 via the input shaft sleeve 158, the second input shaft gear 152, the first relay transmission gear 156, the second relay transmission gear 157, the second output shaft gear 155 and the output shaft sleeve 159, and transmitted to the power take-off shaft 160 from the output shaft 153.

With this power take-off apparatus, the first relay transmission gear 156 has a first gear part that engages the first input shaft gear 151, and a second gear part that engages the second input shaft gear 152, and the second relay transmission gear 157 has a first gear part that engages the second gear part of the first relay transmission gear 156 and engages the second output shaft gear 155, and a second gear part that engages the first output shaft gear 154. Even with this power take-off apparatus, it is necessary to adjust the outer diameter of all the gears, in order to adjust the rotation speed of the power take-off shaft for each of the four speed levels. In view of this, a power take-off apparatus that can cost effectively adjust the rotation speed of the power take-off shaft for each of the four speed levels is desired.

SUMMARY OF THE INVENTION (1) To address the First Related Art, a work vehicle as below is proposed.

A work vehicle comprising:
a wheel differential mechanism having an output shaft and a differential case;
an axle located on a vehicle body lateral outer side of the wheel differential mechanism and interlocked with the output shaft;
a planetary reduction mechanism provided between the output shaft and the axle, and configured to downshift power of the output shaft and transmit resultant power to the axle;
a brake configured to apply friction braking power to the axle via the output shaft, the brake having a friction plate latched to a region of the output shaft between the differential case and the planetary reduction mechanism; and
a support member supporting the output shaft between the differential case and the planetary reduction mechanism, the support member being configured to engage the output shaft relative immovably in a direction along an axis of the output shaft.

According to this configuration, even if an operating force that shifts the output shaft occurs, the output shaft is securely supported by a support member against the operating force such that there is no slippage, thus enabling brake drag to be prevented. Also, in the case of employing a configuration that prevents shifting of the output shaft by providing the output shaft with an abutting part that is received and supported by abutting an end portion of the axle, friction caused by rotation of the axle and the output shaft between the end portion of the axle and the abutting part occurs, but brake drag can be prevented while avoiding the occurrence of this friction.

In one preferred embodiment, the support member supports a region of the output shaft between the friction plate and the planetary reduction mechanism.

According to this configuration, the region of the output shaft near the planetary reduction mechanism side is supported by the support member, thus enabling the output shaft to be supported by the support member such that power transmission to the planetary reduction mechanism from the output shaft is performed in a state where there is no center runout of the output shaft.

In one preferred embodiment, the support member is a bearing that fits onto the output shaft.

According to this configuration, the output shaft is supported so as to not shift while allowing smooth rotation of the output shaft, thus enabling power loss in the wheel drive to be more reliably prevented.

In one preferred embodiment, the brake is configured such that pressure is applied to the friction plate in a direction along the axis of the output shaft and the friction plate is pressed against a friction plate receiving part, and the bearing is supported by the friction plate receiving part.

According to this configuration, a friction plate receiving part is utilized for the support member of the bearing, thus enabling the support structure of the bearing to be realized with a simple structure.

(2) To address the Second Related Art, a power take-off apparatus for a work vehicle as below is proposed.

A power take-off apparatus for a work vehicle, comprising:
an input shaft;
an output shaft to which power of the input shaft is transmitted;
a power take-off shaft coupled in an interlocked manner to the output shaft, and configured to take off the power of the output shaft and output resultant power to an apparatus to be driven; and
a gear shift mechanism configured to shift the power of the input shaft to power having four different rotation speeds and transmit resultant power to the output shaft,
wherein the gear shift mechanism includes:
a first gear train having a first input shaft gear relatively rotatably supported by the input shaft and a first output shaft gear relatively rotatably supported by the output shaft, and configured to transmit the power of the input shaft to the output shaft at a first speed/transmission ratio, in response to the first input shaft gear being coupled in an interlocked manner to the input shaft and the first output shaft gear being coupled in an interlocked manner to the output shaft;
a second gear train having a second input shaft gear relatively rotatably supported by the input shaft and a second output shaft gear relatively rotatably supported by the output shaft, and configured to transmit the power of the input shaft to the output shaft at a second speed/transmission ratio different from the first speed/transmission ratio, in response to the second input shaft gear being coupled in an interlocked manner to the input shaft and the second output shaft gear being coupled in an interlocked manner to the output shaft; and
a relay transmission shaft coupled in an interlocked manner to the first output shaft gear via a first relay transmission gear mechanism having a first relay speed/transmission ratio, and coupled in an interlocked manner to the second output shaft gear via a second relay transmission gear mechanism having a second relay speed/transmission ratio different from the first relay speed/transmission ratio, and
wherein the power take-off apparatus further comprises:
a first operation part configured to alternatively couple the first input shaft gear and the second input shaft gear to the input shaft in an interlocked manner; and
a second operation part configured to alternatively couple the first output shaft gear and the second output shaft gear to the output shaft in an interlocked manner.

According to this configuration, when the first output shaft gear is coupled in an interlocked manner to the input shaft in response to operation by the first operation part and the first output shaft gear is coupled in an interlocked manner to the output shaft in response to operation by the second operation part, the power of the input shaft is transmitted to the output shaft via the first gear train, and transmitted to the power take-off shaft from the output shaft. When the first output shaft gear is coupled in an interlocked manner to the input shaft in response to operation by the first operation part and the second output shaft gear is coupled in an interlocked manner to the output shaft in response to operation by the second operation part, the power of the input shaft is transmitted to the output shaft via the first gear train, the first relay transmission gear mechanism, the first relay transmission shaft, the second relay transmission gear mechanism and the second output shaft gear, and transmitted to the power take-off shaft from the output shaft. When the second output shaft gear is coupled in an interlocked manner to the input shaft in response to operation by the first operation part and the second output shaft gear is coupled in an interlocked manner to the output shaft in response to operation by the second operation part, the power of the input shaft is transmitted to the output shaft via the second gear train, and transmitted to the power take-off shaft from the output shaft. When the second output shaft gear is coupled in an interlocked manner to the input shaft in response to operation by the first operation part and the first output shaft gear is coupled in an interlocked manner to the output shaft in response to operation by the second operation part, the power of the input shaft is transmitted to the output shaft via the second gear train, the second relay transmission gear mechanism, the first relay transmission shaft, the first relay transmission gear mechanism and the first output shaft gear, thus enabling the power of the input shaft to be shifted to power having four different rotation speeds and taken off by the power take-off shaft.

The gears of the first gear train and the gears of the first relay transmission gear mechanism can be provided in a state of being aligned in a straight line that passes through the axis of the input shaft and the axis of the output shaft, and the gears of the second gear train and the gears of the second relay transmission gear mechanism can be provided in a state of being aligned in a straight line that passes through the axis of the input shaft and the axis of the output shaft. That is, the number of gear trains aligned in the direction along the axis of the output shaft can be can kept to two, thus enabling the size of the gear shift mechanism in the direction along the axis of the output shaft to be reduced over the conventional configuration.

In one preferred embodiment, the input shaft, the output shaft and the relay transmission shaft, when viewed in the vehicle body longitudinal direction, are positioned on a straight line in the vehicle body vertical direction. According to this configuration, the input shaft, the output shaft and the relay transmission shaft overlap in a vehicle body plan view, thus enabling the size of the gear shift mechanism in a direction intersecting the axis of the input shaft to be reduced.

In one preferred embodiment, the first gear train has only the first input shaft gear and the first output shaft gear in an engaged state, and the second gear train has only the second input shaft gear and the second output shaft gear in an engaged state. According to this configuration, the structure of the first gear train and the second gear train can be realized with a simple structure that is only provided with two shafts, namely, the input shaft and the output shaft.

In one preferred embodiment, the first relay transmission gear mechanism is a first relay transmission gear that is relatively non-rotatably supported by the relay transmission shaft in a state of engaging the first output shaft gear, and the second relay transmission gear mechanism is a second relay transmission gear that is supported relatively non-rotatably by the relay transmission shaft in a state of engaging the second output shaft gear. According to this configuration, the structure of the first relay transmission gear mechanism is realized with a simple structure only provided with the first relay transmission gear, and the structure of the second relay transmission gear mechanism is realized with a simple structure only provided with the second relay transmission gear.

In one preferred embodiment, the first output shaft gear and the second output shaft gear are supported by the output shaft via a taper roller bearing.

According to this configuration, in the case of a speed level at which the first input shaft gear is coupled in an interlocked manner to the input shaft and the second output shaft gear is coupled in an interlocked manner to the output shaft, the first output shaft gear is supported by the output shaft to which the drive load of the power take-off shaft is applied while being relatively rotatable with respect to the output shaft, and because the first output shaft gear is supported via the taper roller bearing, the first output shaft gear rotates smoothly and power is transmitted smoothly. In the case of a speed level at which the second input shaft gear is coupled in an interlocked manner to the input shaft and the first output shaft gear is coupled in an interlocked manner to the output shaft, the second output shaft gear is supported by the output shaft to which the drive load of the power take-off shaft is applied while being relatively rotatable with respect to the output shaft, and because the second output shaft gear is supported via the taper roller bearing, the second output shaft gear rotates smoothly and power is transmitted smoothly.

(3) To address the Third Related Art, a power take-off apparatus for a work vehicle as below is proposed.

A power take-off apparatus for a work vehicle, comprising:

an input shaft;

an output shaft to which power of the input shaft is transmitted;

a power take-off shaft coupled in an interlocked manner to the output shaft, and configured to take off the power of the output shaft and output resultant power to an apparatus to be driven;

a gear shift mechanism configured to shift the power of the input shaft to power having four different rotation speeds and transmit resultant power to the output shaft, wherein the gear shift mechanism includes:

a first input shaft gear and a second input shaft gear having different diameters and relatively rotatably supported by the input shaft in a state of being alternatively coupled in an interlocked manner to the input shaft;

a first output shaft gear and a second output shaft gear having different diameters and relatively rotatably supported by the output shaft in a state of being alternatively coupled in an interlocked manner to the output shaft;

a first relay transmission gear having a first gear part that engages the first input shaft gear and a second gear part that engages the second input shaft gear;

a second relay transmission gear having a first gear part that engages the first output shaft gear and a second gear part that engages the second output shaft gear; and a gear train configured to couple the first relay transmission gear and the second relay transmission gear in an interlocked manner.

According to this configuration, when the first input shaft gear is coupled in an interlocked manner to the input shaft and the first output shaft gear is coupled in an interlocked manner to the output shaft, the power of the input shaft is transmitted to the output shaft via the first input shaft gear, the first relay transmission gear, the gear train, the second relay transmission gear and the first output shaft gear, and transmitted to the power take-off shaft from the output shaft. When the first input shaft gear is coupled in an interlocked manner to the input shaft and the second output shaft gear is coupled in an interlocked manner to the output shaft, the power of the input shaft is transmitted to the output shaft via the first input shaft gear, the first relay transmission gear, the gear train, the second relay transmission gear and the second output shaft gear, and transmitted to the power take-off shaft from the output shaft. When the second input shaft gear is coupled in an interlocked manner to the input shaft and the first output shaft gear is coupled in an interlocked manner to the output shaft, the power of the input shaft is transmitted to the output shaft via the second input shaft gear, the first relay transmission gear, the gear train, the second relay transmission gear and the first output shaft gear, and transmitted to the power take-off shaft from the output shaft. When the second input shaft gear is coupled in an interlocked manner to the input shaft and the second output shaft gear is coupled in an interlocked manner to the output shaft, the power of the input shaft is transmitted to the output shaft via the second input shaft gear, the first relay transmission gear, the gear train, the second relay transmission gear and the second output shaft gear, and transmitted to the power take-off shaft from the output shaft.

Power also passes through the gear train in the case of shifting the power of the input shaft at one of the four speed levels and transmitting resultant power to the output shaft, and thus, even when, for example, the rotation speed of the power that is input to the input shaft changes, as long as the speed/transmission ratio of the gear train is appropriately changed, the power take-off shaft is driven at an unchanged rotation speed in each the four speed levels, without changing any of the first input shaft gear, the second input shaft gear, the first relay transmission gear, the second relay transmission gear, the first output shaft gear or the second output shaft gear. Also, even when, for example, the rotation speed of the power that is input to the input shaft does not change, as long as the speed/transmission ratio of the gear train is changed, the power take-off shaft is driven at a changed rotation speed in each of the four speed levels, without changing any of the first input shaft gear, the second input shaft gear, the first relay transmission gear, the second relay transmission gear, the first output shaft gear or the second output shaft gear.

In other words, the rotation speed of the power take-off shaft at each of the four speed levels can be adjusted easily and cost effectively by simply changing the gears of the gear train.

In one preferred embodiment, the gear train has only a first relay gear that is coupled in an interlocked manner to the first relay transmission gear, and a second relay gear that is coupled in an interlocked manner to the second relay transmission gear in a state of engaging the first relay gear. According to this configuration, the structure of the gear train is realized with a simple structure that is only provided with a first relay gear and a second relay gear.

In one preferred embodiment, the first relay gear and the first and second gear parts of the first relay transmission gear are supported by the same first relay shaft, and the second relay gear and the first and second gear parts of the second relay transmission gear are supported by the same second relay shaft. According to this configuration, the structure of the power take-off apparatus is realized with a simple structure that is only provided with a total of four shafts, namely, the input shaft, the first relay shaft, the second relay shaft, and the output shaft.

In one preferred embodiment, the first relay shaft and the second relay shaft extend in the vehicle body longitudinal direction, and the gear train is provided spanning a region of the first relay shaft that is located on the rear side with respect to the first and second gear parts of the first relay transmission gear and a region of the second relay shaft that is located on the rear side with respect to the first and second gear parts of the second relay transmission gear. According to this configuration, the gear train can be removed rearwardly of the first relay transmission gear and the second relay transmission gear, thus facilitating easy replacement of the gear train.

(4) Further features of the present invention and advantages thereof will become apparent from the following description.

DETAILED DESCRIPTION OF PREFERRED EMBODIMENTS

Figure 1:
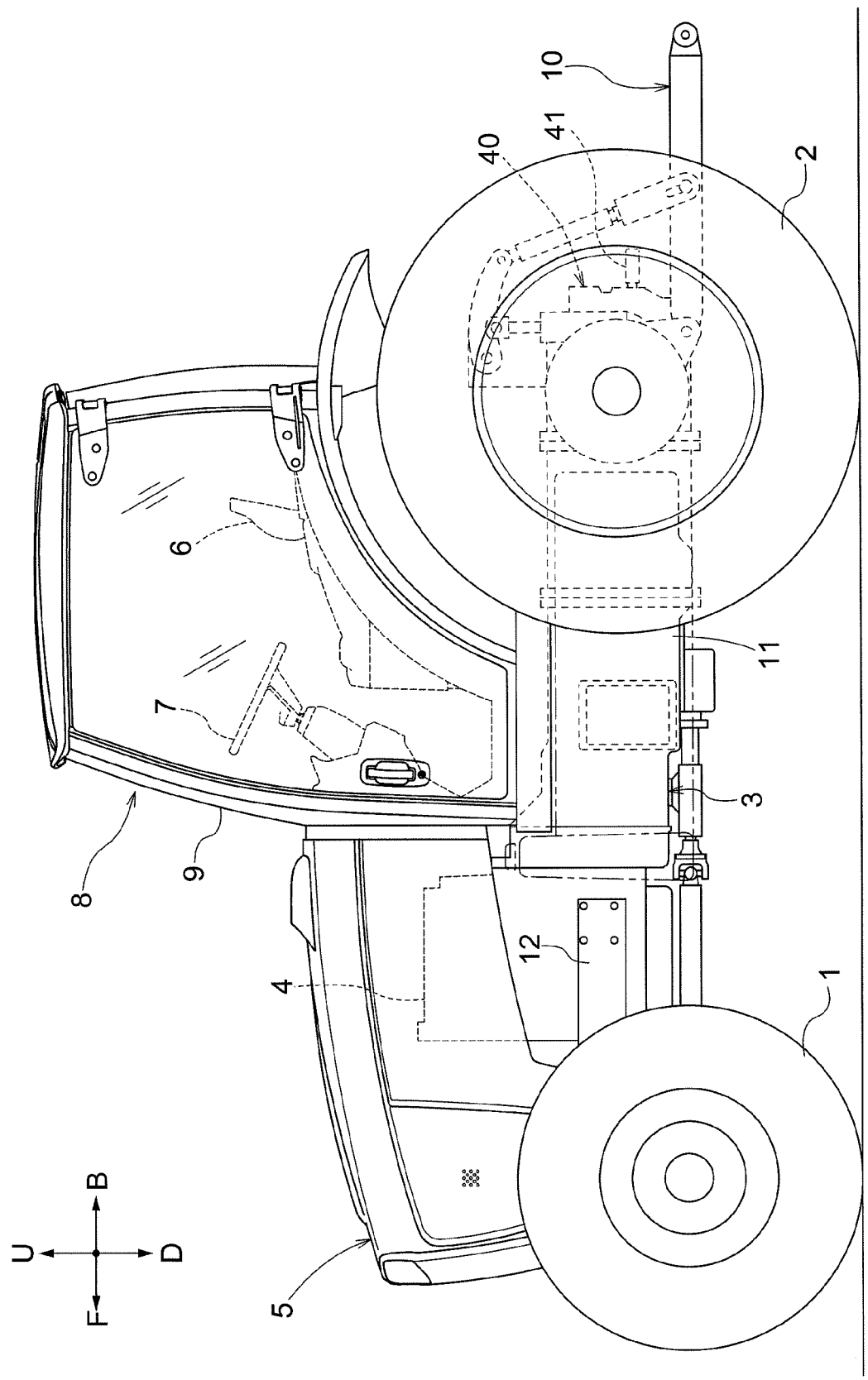
FIG. 1 shows a first embodiment (same through to FIG. 7), and is a left side view showing the entirety of a tractor serving as an example of a work vehicle.

In the following description, in relation to a traveling vehicle body of a tractor (example of "work vehicle"), the direction of arrow F shown in FIG. 1 is "forward of the vehicle body", the direction of arrow B is "rearward of the vehicle body", the direction of arrow U is "upward of the vehicle body", the direction of arrow D is "downward of the vehicle body", the direction on the near side of the page is "leftward of the vehicle body", and the direction on the far side of the page is "rightward of the vehicle body".

First Embodiment

Overall Configuration of Tractor

As shown in FIG. 1, the tractor is provided with a traveling vehicle body 3 steerably and drivably equipped with a right and left pair of front wheels 1, and drivably equipped with a right and left pair of rear wheels 2. A prime mover part 5 having an engine 4 is formed in a front portion of the traveling vehicle body 3. A driving part 8 having a driver's seat 6 and a steering wheel 7 for steering the front wheels 1 is formed in a rear portion of the traveling vehicle body 3. The driving part 8 is provided with a cabin 9 covering an occupant space. A link mechanism 10 for coupling various types of work apparatuses such as a rotary tilling apparatus (not shown) to the tractor in a liftably operable manner and a power take-off apparatus 40 that takes off power from the engine 4 with a power take-off shaft 41 and outputs resultant power to the coupled work apparatus (apparatus to be driven) are provided in a rear portion of the traveling vehicle body 3. A vehicle body frame of the traveling vehicle body 3 is constituted by a transmission case 11 that is coupled at a front portion to a rear portion of the engine 4 and supports the rear wheels 2 and a front wheel support frame 12 that is coupled to a lower portion of the engine 4 and supports the front wheels 1.

Configuration of Power Transmission

Figure 2:
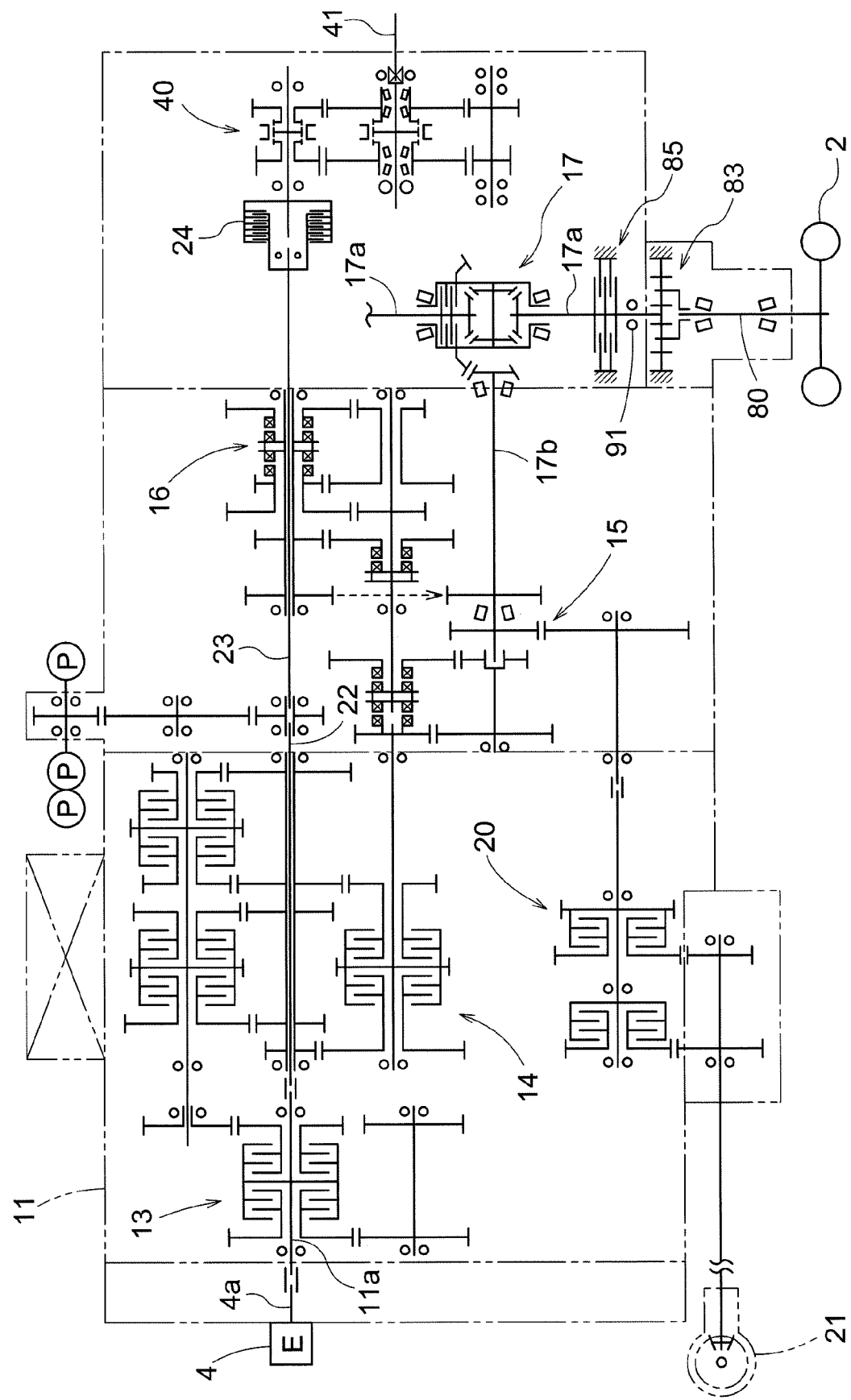
FIG. 2 is a diagram showing a power transmission structure.

The power of the engine 4 is transmitted to the front wheels 1, the rear wheels 2 and the power take-off shaft 41 based on the power transmission structure shown in FIG. 2.

That is, the power of an engine output shaft 4a of the engine 4 is transmitted to a transmission input shaft 11a of the transmission case 11. The power of the transmission input shaft 11a is input to a forward/reverse switching apparatus 13 and converted into forward power and reverse power. The forward power and reverse power obtained through conversion are input to an 8-speed main transmission apparatus 14 and undergo main transmission, and the forward power and reverse power that have undergone main transmission are input to a 2-speed creep transmission apparatus 15. The output of the creep transmission apparatus 15 is input to a 3-speed auxiliary transmission apparatus 16 and undergoes auxiliary transmission. The power obtained through auxiliary transmission is input to a rear wheel differential mechanism 17 and transmitted to the right and left rear wheels 2 from right and left output shafts 17a of the rear wheel differential mechanism 17. The power from the auxiliary transmission apparatus 16 is transmitted to a front wheel transmission apparatus 20 via the input shaft 17b of the rear wheel differential mechanism 17, is transmitted to a front wheel differential mechanism 21 from the front wheel transmission apparatus 20, and is transmitted to the right and left front wheels 1 from the front wheel differential mechanism 21. The front wheel transmission apparatus 20 is configured to be switchable between an OFF state, a uniform speed transmission state and an acceleration transmission state. The front wheel transmission apparatus 20, when switched to the OFF state, cuts off output to the front wheel differential mechanism 21, and the tractor enters a two-wheel drive state in which only the rear wheels 2 are driven out of the front wheels 1 and the rear wheels 2. The front wheel transmission apparatus 20, when switched to the uniform speed transmission state, outputs the power from the input shaft 17b to the front wheel differential mechanism 21 in the uniform speed state, and the tractor enters a four-wheel drive state in which the front wheels 1 and the rear wheels 2 are driven in a state where the average circumferential speed of the right and left front wheels 1 is substantially equal the average circumferential speed of the right and left rear wheels 2. The front wheel transmission apparatus 20, when switched to the acceleration transmission state, upshifts the power from the input shaft 17b and outputs resultant power to the front wheel differential mechanism 21, and the tractor enters a four-wheel drive state in which the front wheels 1 and the rear wheels 2 are driven in a state where the average circumferential speed of the right and left front wheels 1 is faster than the average circumferential speed of the right and left rear wheels 2.

The power of the transmission input shaft 11a is transmitted to a work clutch 24 via a front rotation shaft 22 coupled at a front end portion to a rear end portion of the transmission input shaft 11a and a rear rotation shaft 23 coupled at a front end portion to a rear end portion of the front rotation shaft 22, and transmitted to the power take-off apparatus 40 from the work clutch 24.

Configuration of Power Take-Off Apparatus

Figure 3:
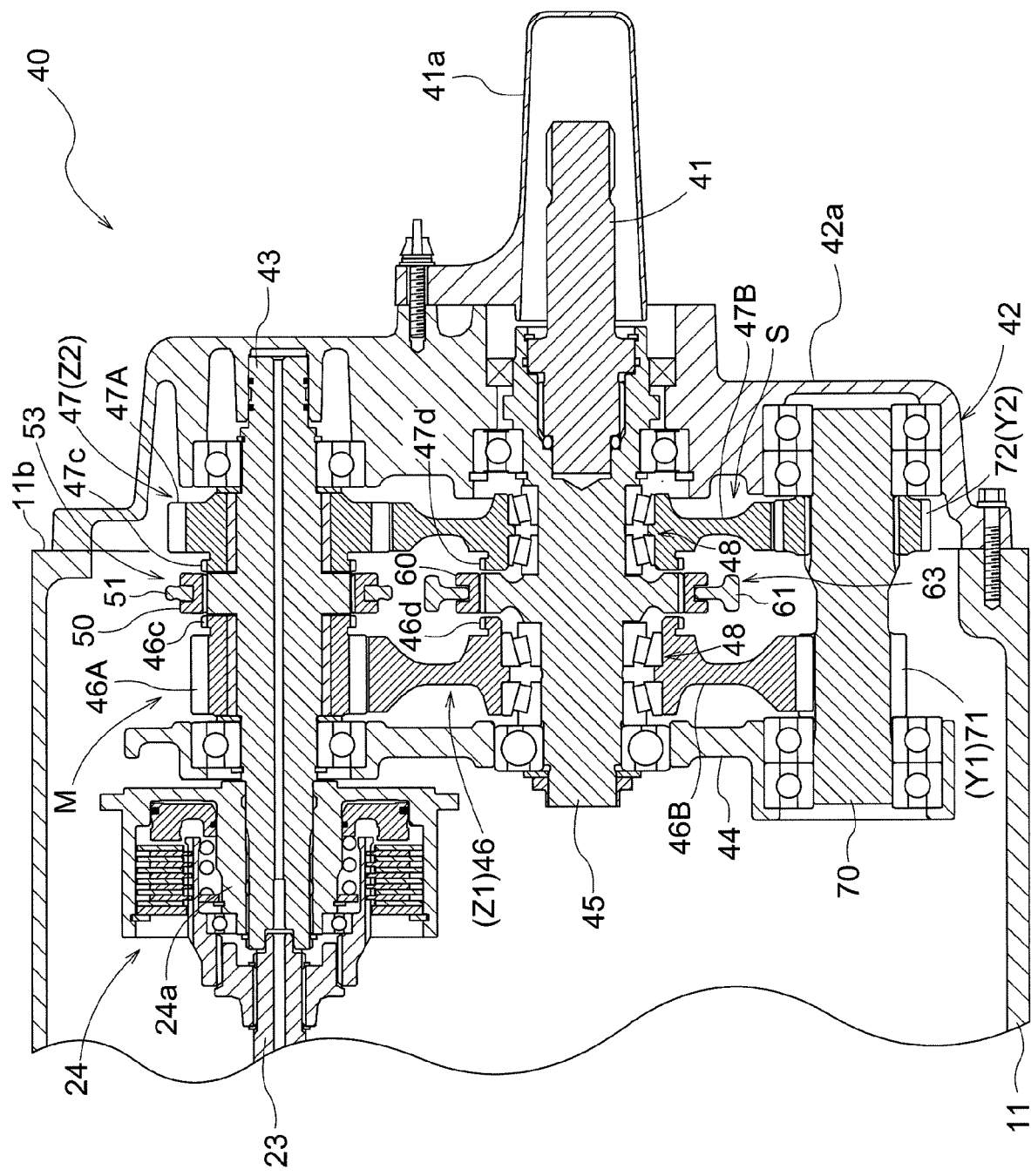
FIG. 3 is a side view in vertical section of a power take-off apparatus.

The power take-off apparatus 40 is, as shown in FIG. 1, provided in a rear portion of the traveling vehicle body 3. The power take-off apparatus 40 is, as shown in FIG. 3, provided with a power take-off case 42 formed in a rear portion of the transmission case 11. The power take-off case 42 is constituted by the transmission case 11 and a gear case 42a removably attached to a rear wall part 11b of the transmission case 11 in a state of closing an opening formed in the rear wall part 11b. The power take-off shaft 41 protrudes rearward from a vertically intermediate portion of the gear case 42a. In FIG. 3, the power take-off shaft 41 is covered by a cover 41a removably attached to the gear case 42a.

Figure 4:
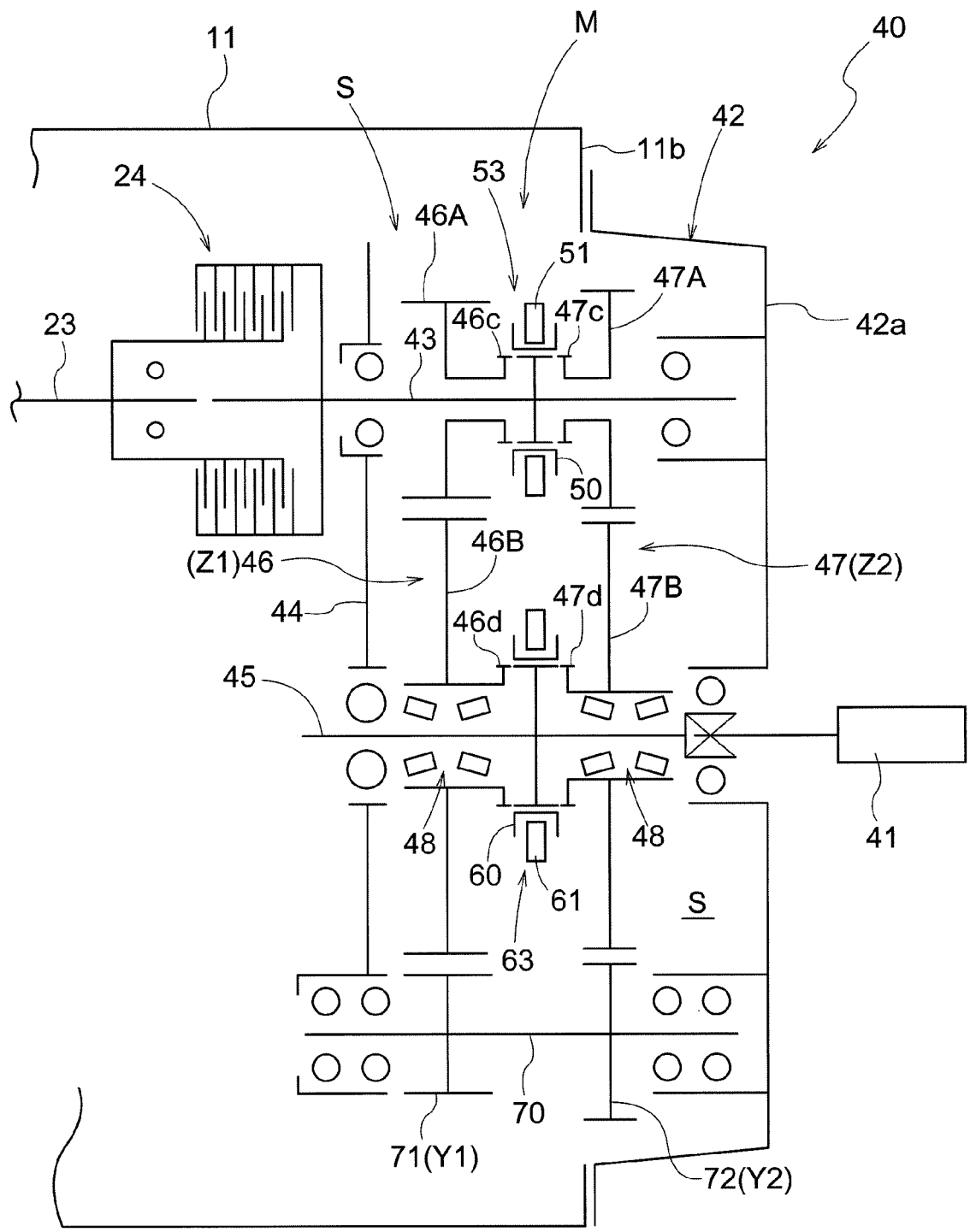
FIG. 4 is a diagram showing the power take-off apparatus.

As shown in FIGS. 3 and 4, an input shaft 43 is provided in an upper portion of an interior space S of the power take-off case 42 in a state of extending in the vehicle body longitudinal direction. The input shaft 43 is rotatably supported by the gear case 42a and a supporting wall part 44 located forward of the gear case 42a. The supporting wall part 44 is coupled to the gear case 42a via a coupling rod part (not shown) that extends rearward from a plurality of places of a peripheral portion of the supporting wall part 44, and is supported by the gear case 42a. A front portion of the input shaft 43 is coupled in an interlocked manner to an output member 24a of the work clutch 24. The power of the transmission input shaft 11a, that is, the power of the engine 4, is transmitted to the input shaft 43.

An output shaft 45 that extends in the vehicle body longitudinal direction in parallel with the input shaft 43 is provided downward of the input shaft 43. The output shaft 45 is rotatably supported by the gear case 42a and the supporting wall part 44. The output shaft 45 is coupled in an interlocked manner to the power take-off shaft 41 by spline engagement with a rear portion of the output shaft 45 and a front portion of the power take-off shaft 41. It is possible to take off the power of the output shaft 45 with the power take-off shaft 41.

A first gear train 46 is provided spanning the front portion of the input shaft 43 and the front portion of the output shaft 45. The first gear train 46 has only two gears, namely, a first input shaft gear 46A relatively rotatably supported by the input shaft 43 and a first output shaft gear 46B relatively rotatably supported by the output shaft 45 in a state of engaging the first input shaft gear 46A. Backward of the first gear train 46, a second gear train 47 is provided spanning and the input shaft 43 and the output shaft 45. The second gear train 47 has only two gears, namely, a second input shaft gear 47A relatively rotatably supported by the input shaft 43 and a second output shaft gear 47B relatively rotatably supported by the output shaft 45 in a state of engaging the second input shaft gear 47A. The first output shaft gear 46B is supported by the output shaft 45 via a taper roller bearing 48 interposed between the output shaft 45 and a boss part of the first output shaft gear 46B. The second output shaft gear 47B is supported by the output shaft 45 via a taper roller bearing 48 interposed between the output shaft 45 and a boss part of the second output shaft gear 47B. The taper roller bearing 48 of the first output shaft gear 46B and the taper roller bearing 48 of the second output shaft gear 47B are provided with two rows of rollers in an outward facing state.

The outer diameter of the second input shaft gear 47A is configured to be larger than the outer diameter of the first input shaft gear 46A. The outer diameter of the first output shaft gear 46B is configured to be larger than the outer diameter of the first input shaft gear 46A. The outer diameter of the second output shaft gear 47B is configured to be larger than the outer diameter of the second input shaft gear 47A. The outer diameter of the second output shaft gear 47B is configured to be smaller than the outer diameter of the first output shaft gear 46B. A first speed/transmission ratio Z1 of the first gear train 46 differs from a second speed/transmission ratio Z2 of the second gear train 47.

As shown in FIGS. 3 and 4, an input shaft sleeve 50 is relatively rotatably and slidably supported by the input shaft 43, between the first input shaft gear 46A and the second input shaft gear 47A. The input shaft sleeve 50, when slid to the first input shaft gear side, engages a latch part 46c that is formed on a side portion of the first input shaft gear 46A, and couples the first input shaft gear 46A to the input shaft 43 in an interlocked manner. The input shaft sleeve 50, when slid to the second input shaft gear side, engages the latch part 47c that is formed on a side portion of the second input shaft gear 47A, and couples the second input shaft gear 47A to the input shaft 43 in an interlocked manner.

Figure 5:
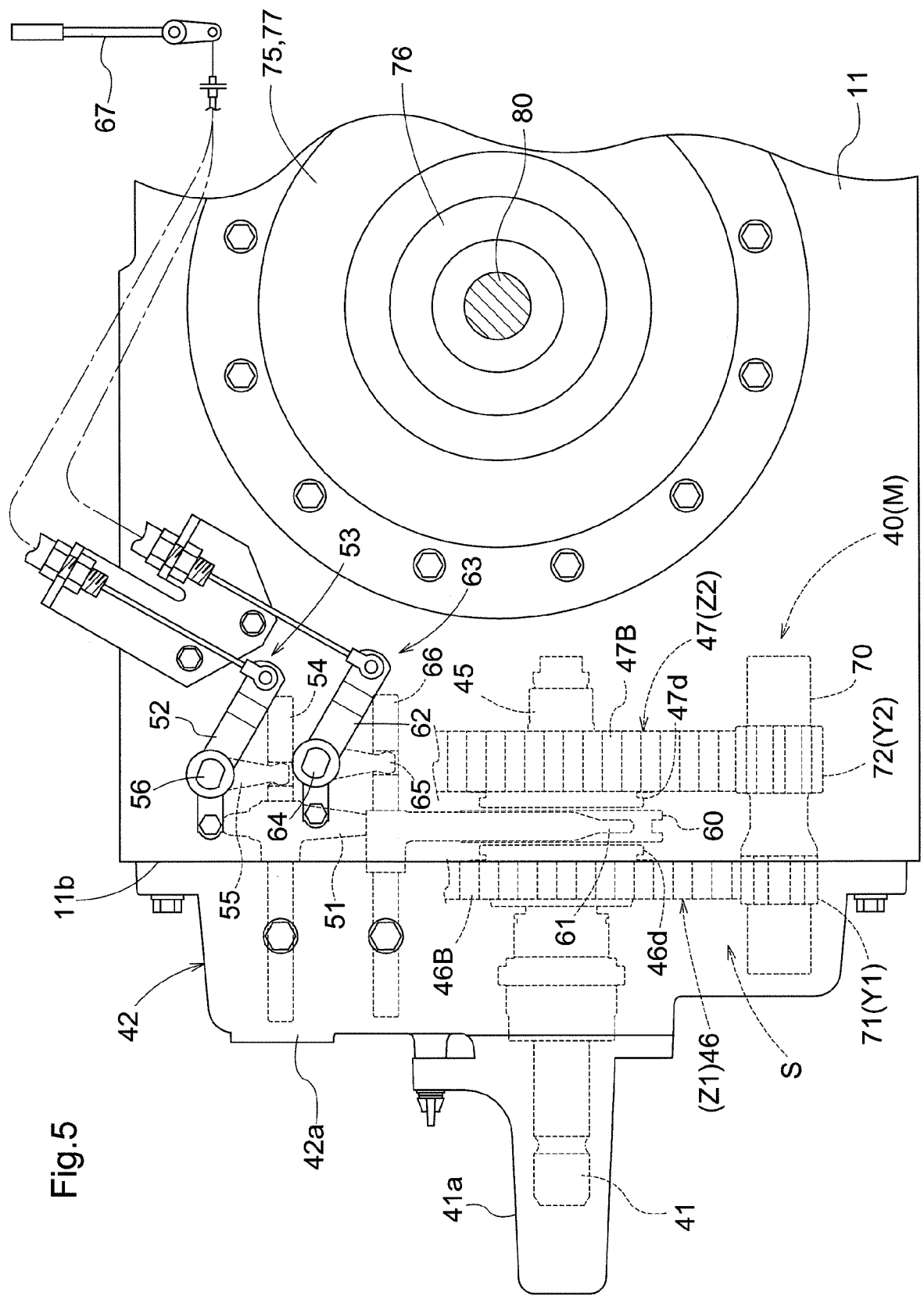
FIG. 5 is a right side view showing operation parts for shifting.
Figure 6:
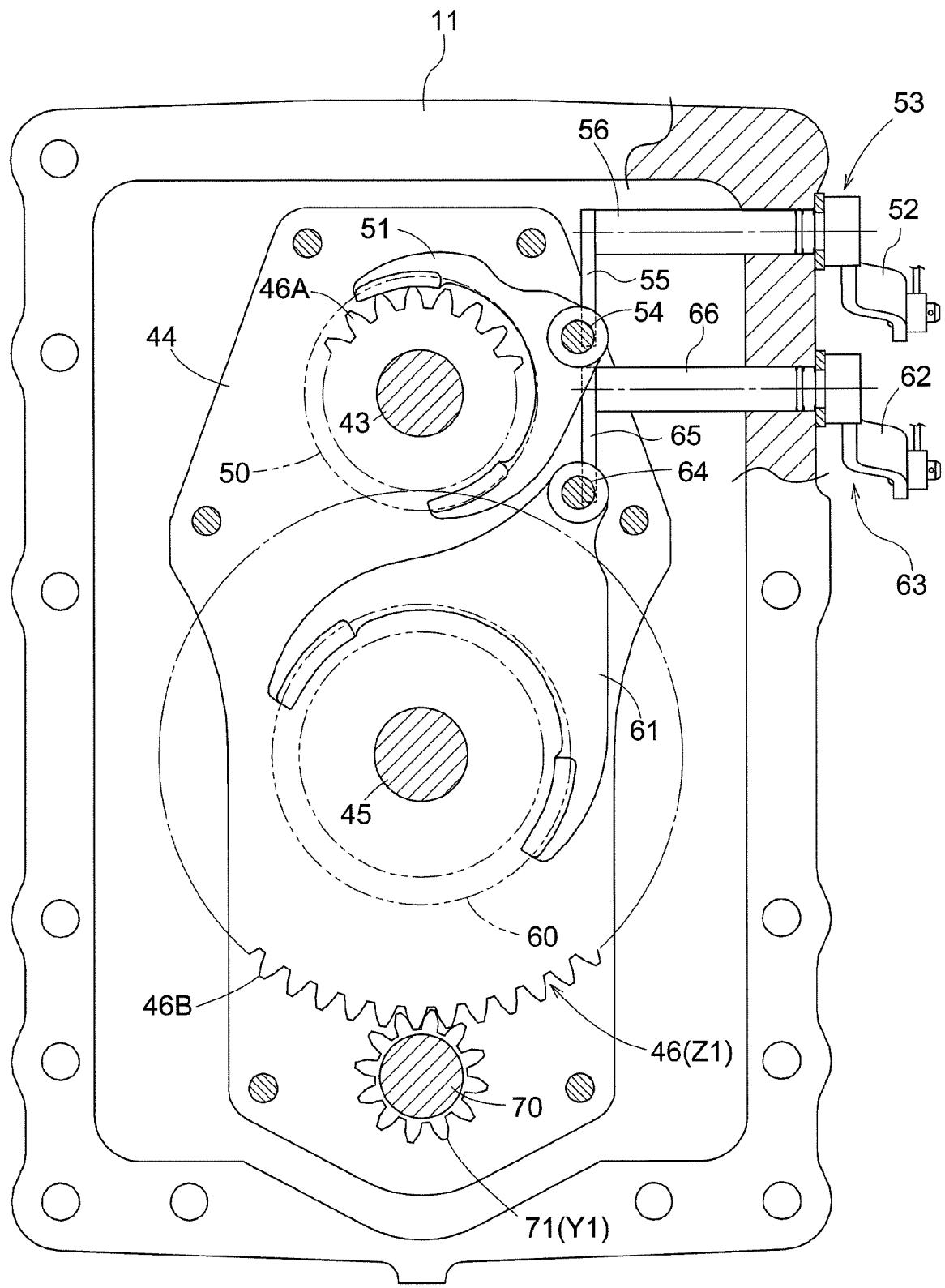
FIG. 6 is a rear view showing operation parts for shifting.

As shown in FIGS. 3, 5 and 6, a first operation part 53 that alternatively couples the first input shaft gear 46A and the second input shaft gear 47A to the input shaft 43 in an interlocked manner is constituted by a first shift fork 51 that engages the input shaft sleeve 50, a first transmission arm 52 swingably provided outside the power take-off case 42, and the like. The first shift fork 51 and the first transmission arm 52 are coupled in an interlocked manner via a slide shaft 54 that slidably operates the first shift fork 51, a swinging arm 55 that engages the slide shaft 54 at a free end portion, and a rotation shaft 56 that swingably supports the swinging arm 55 and the first transmission arm 52.

In operation of the first operation part 53, the first shift fork 51 is slidably operated in the direction along the axis of the input shaft 43, in response to the first transmission arm 52 being swingably operated with the axis of the rotation shaft 56 as the swing fulcrum, and the first shift fork 51 couples the first input shaft gear 46A to the input shaft 43 in an interlocked manner by engaging the input shaft sleeve 50 with the first input shaft gear 46A, and the first shift fork 51 couples the second input shaft gear 47A to the input shaft 43 in an interlocked manner by engaging the input shaft sleeve 50 with the second input shaft gear 47A.

As shown in FIGS. 3 and 4, an output shaft sleeve 60 is relatively rotatably and slidably supported by the output shaft 45, between the first output shaft gear 46B and the second output shaft gear 47B. The output shaft sleeve 60, when slid to the first output shaft gear side, couples the first output shaft gear 46B to the output shaft 45 in an interlocked manner by engaging the latch part 46d that is formed on a side portion of the first output shaft gear 46B. The output shaft sleeve 60, when slid to the second output shaft gear side, couples the second output shaft gear 47B to the output shaft 45 in an interlocked manner by engaging the latch part 47d that is formed on a side portion of the second output shaft gear 47B.

As shown in FIGS. 3, 5 and 6, a second operation part 63 that alternatively couples the first output shaft gear 46B and the second output shaft gear 47B to the output shaft 45 in an interlocked manner is constituted by a second shift fork 61 that engages an output shaft sleeve 60, a second transmission arm 62 provided to be swingably operable outside the power take-off case 42, and the like. The second shift fork 61 and the second transmission arm 62 are coupled in an interlocked manner via a slide shaft 64 that slidably operates the second shift fork 61, a swinging arm 65 that engages the slide shaft 64 at a free end portion, and a rotation shaft 66 that swingably supports the swinging arm 65 and the second transmission arm 62.

In operation of the second operation part 63, the second shift fork 61 is slidably operated in the direction along the axis of the output shaft 45, in response to the second transmission arm 62 being swingably operated with the axis of the rotation shaft 66 as the swing fulcrum, and the second shift fork 61 couples the first output shaft gear 46B to the output shaft 45 in an interlocked manner by engaging the output shaft sleeve 60 with the first output shaft gear 46B, and the second shift fork 61 couples the second output shaft gear 47B to the output shaft 45 in an interlocked manner by engaging the output shaft sleeve 60 with the second output shaft gear 47B.

The first operation part 53 and the second operation part 63 are, as shown in FIG. 5, operated by a single shifter 67 that is linked to the first transmission arm 52 and the second transmission arm 62. That is, the shifter 67 is configured to be switchable between a state of being linked to the first transmission arm 52 in which the first transmission arm 52 becomes swingably operable and a state of being linked to the second transmission arm 62 in which the second transmission arm 62 becomes swingably operable.

As shown in FIGS. 3 and 4, a relay transmission shaft 70 extending in the vehicle body longitudinal direction in parallel with the output shaft 45 is provided downward of the output shaft 45. The relay transmission shaft 70 is rotatably supported by the gear case 42a and the supporting wall part 44. As shown in FIG. 6, when viewed in the vehicle body longitudinal direction, the input shaft 43, the output shaft 45 and relay transmission shaft 70 are positioned on a straight line in the vehicle body vertical direction. The relay transmission shaft 70, as shown in FIGS. 3 and 4, is coupled in an interlocked manner to the first output shaft gear 46B by the first relay transmission gear mechanism 71 provided on a front portion of the relay transmission shaft 70, and is coupled in an interlocked manner to the second output shaft gear 47B by a second relay transmission gear mechanism 72 provided on a rear portion of the relay transmission shaft 70. The first gear train 46 and the first relay transmission gear mechanism 71 are provided on a side surface of the vehicle body in a single file state on a straight line extending in the vehicle body vertical direction through which pass the axis of the input shaft 43, the axis of the output shaft 45 and the axis of the relay transmission shaft 70. The second gear train 47 and the second relay transmission gear mechanism 72 are provided on a side surface of the vehicle body in a single file state on a straight line extending in the vehicle body vertical direction through which pass the axis of the input shaft 43, the axis of the output shaft 45, and the axis of the relay transmission shaft 70. The first relay transmission gear mechanism 71 is constituted by a first relay transmission gear relatively non-rotatably supported by the relay transmission shaft 70 a state of engaging the first output shaft gear 46B. The second relay transmission gear mechanism 72 is constituted by a second relay transmission gear relatively non-rotatably supported by the relay transmission shaft 70 in a state of engaging the second output shaft gear 47B.

The outer diameter of the first relay transmission gear is configured to be smaller than the outer diameter of the first output shaft gear 46B. The outer diameter of the second relay transmission gear is configured to be smaller than the outer diameter of the second output shaft gear 47B. The outer diameter of the second relay transmission gear is configured to be larger than the outer diameter of the first relay transmission gear. The first relay speed/transmission ratio Y1 of the first relay transmission gear mechanism 71 differs from the second relay speed/transmission ratio Y2 of the second relay transmission gear mechanism 72.

A gear shift mechanism M that shifts the power of the input shaft 43 to transmission power having four different rotation speeds and transmits resultant power to the output shaft 45 is constituted by the first gear train 46, the second gear train 47, the input shaft sleeve 50, the output shaft sleeve 60, the relay transmission shaft 70, the first relay transmission gear mechanism 71, and the second relay transmission gear mechanism 72. In the power take-off apparatus 40, in response to the first input shaft gear 46A and the second input shaft gear 47A being alternatively coupled in an interlocked manner to the input shaft 43 by the first operation part 53, and the first output shaft gear 46B and the second output shaft gear 47B being alternatively coupled in an interlocked manner to the output shaft 45 by the second operation part 63, the gear shift mechanism M switches between a first transmission state, a second transmission state, a third transmission state and a fourth transmission state, and the rotation speed of the power take-off shaft 41 is changed through four steps.

That is, when the first input shaft gear 46A is coupled in an interlocked manner to the input shaft 43 in response to operation of the input shaft sleeve 50 by the first operation part 53, and the first output shaft gear 46B is coupled in an interlocked manner to the output shaft 45 in response to operation of the output shaft sleeve 60 by the second operation part 63, the gear shift mechanism M enters the first transmission state. The gear shift mechanism M in the first transmission state transmits the power of the input shaft 43 to the output shaft 45 via the first gear train 46, and the power take-off shaft 41 is driven at a rotation speed that is set by the first transmission state.

When the second input shaft gear 47A is coupled in an interlocked manner to the input shaft 43 in response to operation of the input shaft sleeve 50 by the first operation part 53 and the second output shaft gear 47B is coupled in an interlocked manner to the output shaft 45 in response to operation of the output shaft sleeve 60 by the second operation part 63, the gear shift mechanism M enters the second transmission state. The gear shift mechanism M in the second transmission state transmits the power of the input shaft 43 to the output shaft 45 via the second gear train 47, and the power take-off shaft 41 is driven at a rotation speed that is set by the second transmission state.

When the first input shaft gear 46A is coupled in an interlocked manner to the input shaft 43 in response to operation of the input shaft sleeve 50 by the first operation part 53 and the second output shaft gear 47B is coupled in an interlocked manner to the output shaft 45 in response to operation of the output shaft sleeve 60 by the second operation part 63, the gear shift mechanism M enters the third transmission state. The gear shift mechanism M in the third transmission state transmits the power of the input shaft 43 to the output shaft 45 via the first gear train 46, the first relay transmission gear mechanism 71, the relay transmission shaft 70, the second relay transmission gear mechanism 72 and the second output shaft gear 47B, and the power take-off shaft 41 is driven at a rotation speed that is set by the third transmission state. At this time, the first output shaft gear 46B is supported by the output shaft 45 to which the drive load of the power take-off shaft 41 is applied, while being relatively rotatable with respect to the output shaft 45, and, because of being supported via the taper roller bearing 48, performs power transmission while rotating smoothly.

When the second input shaft gear 47A is coupled in an interlocked manner to the input shaft 43 in response to operation of the input shaft sleeve 50 by the first operation part 53 and the first output shaft gear 46B is coupled in an interlocked manner to the output shaft 45 in response to operation of the output shaft sleeve 60 by the second operation part 63, the gear shift mechanism M enters the fourth transmission state. The gear shift mechanism M in the fourth transmission state transmits the power of the input shaft 43 to the output shaft 45 via the second gear train 47, the second relay transmission gear mechanism 72, the relay transmission shaft 70, the first relay transmission gear mechanism 71 and the first output shaft gear 46B, and the power take-off shaft 41 is driven at a rotation speed that is set by the fourth transmission state. At this time, the second output shaft gear 47B is supported by the output shaft 45 to which the drive load of the power take-off shaft 41 is applied, while being relatively rotatably with respect to the output shaft 45, and, because of being supported via the taper roller bearing 48, performs power transmission while rotating smoothly.

Drive Structure of Rear Wheels

Figure 7:
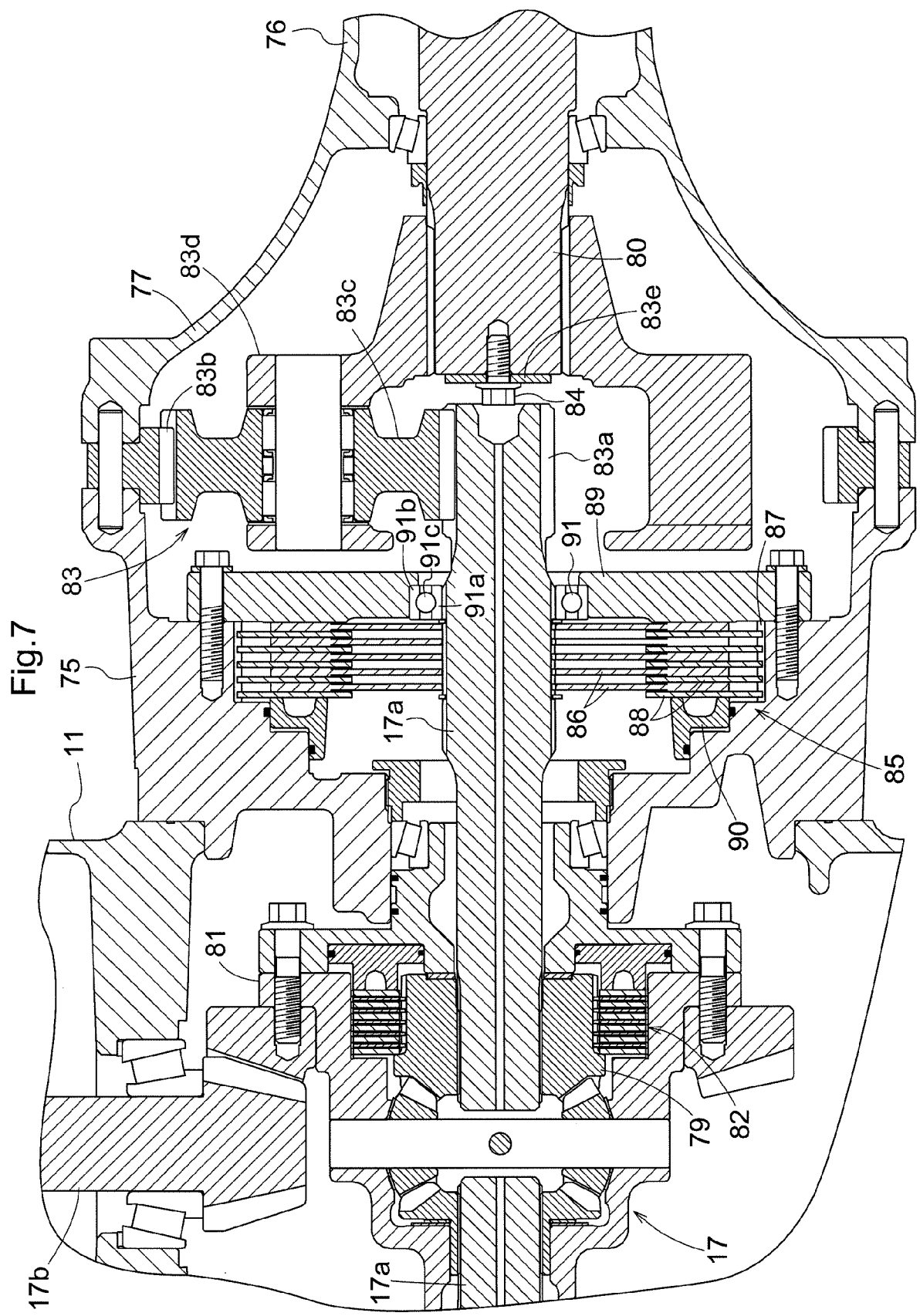
FIG. 7 is a view in section showing a rear-wheel driving part.

As shown in FIG. 7, a brake case part 75 is provided on a side portion of the transmission case 11, and an axle case 76 extends laterally outward of the vehicle body from the brake case part 75. A reduction case part 77 is provided on a base portion of the axle case 76.

The rear wheel differential mechanism 17 is provided inside the transmission case 11. The output shaft 17a of the rear wheel differential mechanism 17 extends from a side gear 79 to inside the reduction case part 77. A rear wheel axle 80 is rotatably supported inside the axle case 76 in a state of being located on the vehicle body lateral outer side of the rear wheel differential mechanism 17. The output shaft 17a and the rear wheel axle 80 are provided in a state of being located on the same axis. A locking apparatus 82 that enables differential locking of the rear wheel differential mechanism 17 is provided spanning the side gear 79 and a differential case 81.

Inside the reduction case part 77, a planetary reduction mechanism 83 is provided spanning the output shaft 17a and the rear wheel axle 80. The planetary reduction mechanism 83 has a sun gear 83a that is driven by the output shaft 17a, an internal gear 83b that is supported by the reduction case part 77, and a plurality of planet gears 83c that are aligned in the circumferential direction of the sun gear 83a. A carrier 83d that supports the plurality of planet gears 83c is coupled to the rear wheel axle 80. A stopper 83e that prevents the carrier 83d from coming off the rear wheel axle 80 is mounted to the rear wheel axle 80 with a bolt 84.

In the rear wheel differential mechanism 17, the power of the input shaft 17b is transmitted to the output shaft 17a via the differential case 81 and the side gear 79. The power of the output shaft 17a is transmitted to the rear wheel axle 80 after being downshifted by the planetary reduction mechanism 83 and drives the rear wheel axle 80, and the rear wheels 2 are driven by the rear wheel axle 80.

A brake 85 is provided inside the brake case part 75. The brake 85 has a plurality of friction plates 86 latched to a region of the output shaft 17a between the differential case 81 of the rear wheel differential mechanism 17 and the planetary reduction mechanism 83, and a plurality of friction plates 88 latched to a support part 87 provided on the brake case part 75. A friction plate receiving part 89 that receives the friction plates 86 and the friction plates 88 is provided on the side on which the planetary reduction mechanism 83 is located with respect to the friction plates 86 and the friction plates 88. The friction plate receiving part 89 is fixed to the brake case part 75. A hydraulic piston 90 is provided on an opposite side to the side on which the friction plate receiving part 89 is located with respect to the friction plates 86 and friction plates 88.

As shown in FIG. 7, the output shaft 17a is configured to be supported between the differential case 81 and the planetary reduction mechanism 83 by a support member 91. The support member 91 is configured to engage the output shaft 17a relatively immovably in the direction along the axis of the output shaft 17a.

Specifically, as shown in FIG. 7, the support member 91 is mounted in a region of the output shaft 17a between the friction plates 86 that are latched to the output shaft 17a and the planetary reduction mechanism 83. The support member 91 is constituted by a bearing provided with an inner ring 91a fitted onto the output shaft 17a, an outer ring 91b that fits into an attachment hole formed in the friction plate receiving part 89, and a rolling body 91c interposed between the inner ring 91a and the outer ring 91b. The support member 91 relatively immovably engages the output shaft 17a by friction between the inner ring 91a and the output shaft 17a. The support member 91 is supported by the brake case part 75 by being supported by the friction plate receiving part 89.

In operation of the brake 85, in response to operating hydraulic pressure being supplied to the hydraulic piston 90, the brake enters an ON state and is applied to the rear wheels 2, and in response to cancelling supply of operating hydraulic pressure to the hydraulic piston 90, the brake enters an OFF state and is released from the rear wheels 2.

That is, when operating hydraulic pressure is supplied to the hydraulic piston 90, the hydraulic piston 90 is pressed toward the friction plates 86 by the operating hydraulic pressure, the friction plates 86 and the friction plates 88 are pressed in the direction along the axis of the output shaft 17a by the hydraulic piston 90 and pressed against the friction plate receiving part 89, and friction braking power generated by the friction plates 86 and the friction plates 88 is applied to the rear wheel axle 80 via the output shaft 17a and the planetary reduction mechanism 83.

When supply of the operating hydraulic pressure to the hydraulic piston 90 is canceled, the pressing of the hydraulic piston 90 toward the friction plates 86 is released, the pressing of the friction plates 86 and the friction plates 88 against the friction plate receiving part 89 is released, and generation of friction braking power by the friction plates 86 and the friction plates 88 is canceled.

For example, when the brake 85 is operated to an ON state, the output shaft 17a is prevented from moving together with the friction plates 86 by the support member 91, and after the brake 85 has returned to an OFF state, the friction plates 86 of the output shaft 17a and the friction plates 88 of the support part 87 remaining in contact and rotation resistance being applied to the output shaft 78 can be avoided.

Other Embodiments of the First Embodiment (1) In the embodiment described above, the rear wheels 2 are driven, but the present invention is not limited thereto, and the front wheels may be driven.

(2) In the embodiment described above, the support member 91 is provided in a region of the output shaft 17a between the brake 85 and the planetary reduction mechanism 83, but the present invention is not limited thereto, and the support member 91 may be provided in a region of the output shaft 17a between the rear wheel differential mechanism 17 (wheel differential mechanism) and the brake 85.

(3) In the embodiment described above, the support member 91 is a bearing, but the present invention is not limited thereto. For example, it is possible to employ a bushing or impregnated metal.

(4) In the embodiment described above, the bearing is supported by the friction plate receiving part 89, but the present invention is not limited thereto, and a dedicated holder supporting the bearing may be provided.

(5) In the embodiment described above, the first gear train 46 and the second gear train 47 have only two gears, but these gear trains may have three or more gears. Also, the first relay transmission gear mechanism 71 and the second relay transmission gear mechanism 72 have only one gear, but these relay transmission gear mechanisms may have two or more gears.

(6) In the embodiment described above, the input shaft 43, the output shaft 45 and the relay transmission shaft 70 are provided in state of being positioned on a straight line extending in the vehicle body vertical direction when viewed in the vehicle body longitudinal direction. Instead thereof, the input shaft 43 and the output shaft 45 may be positioned on a straight line extending in the vehicle body vertical direction, and the relay transmission shaft 70 may be shifted laterally with respect to the input shaft 43 and the output shaft 45, or the input shaft 43 and the relay transmission shaft 70 may be positioned on a straight line extending in the vehicle body vertical direction, and the output shaft 45 may be shifted laterally with respect to the input shaft 43 and the relay transmission shaft 70, or the input shaft 43, the output shaft 45 and the relay transmission shaft 70 may deviate from a straight line extending in the vehicle body vertical direction, for example.

(7) In the embodiment described above, the first output shaft gear 46B and the second output shaft gear 47B are supported by the output shaft 45 via the taper roller bearing 48, but the present invention is not limited thereto. For example, it is possible to employ a ball bearing or a needle bearing.

Second Embodiment

Overall Configuration of Tractor

Figure 8:
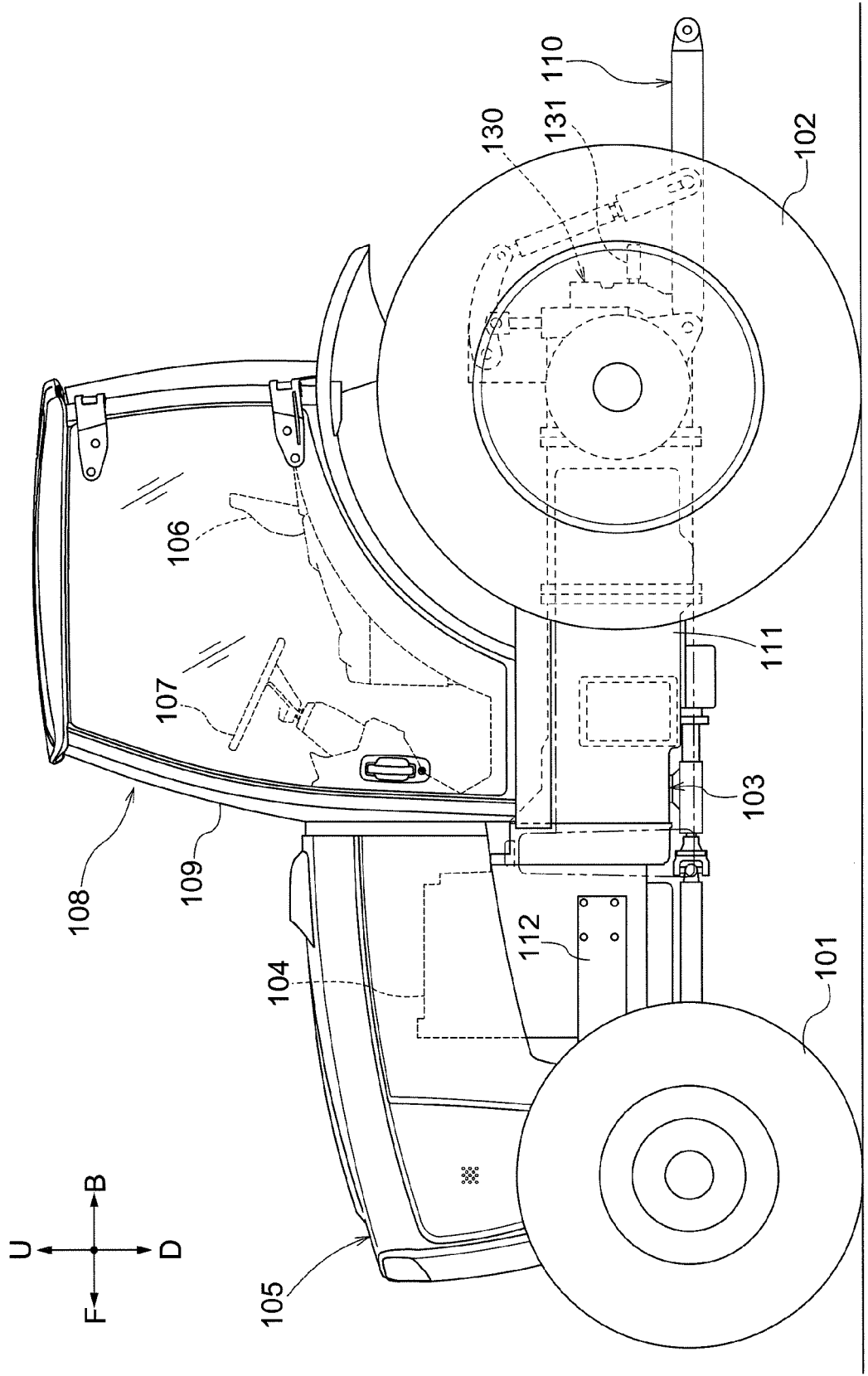
FIG. 8 shows a second embodiment (same through to FIG. 11), and is a left side view showing the entirety of a tractor serving as an example of a work vehicle.

As shown in FIG. 8, the tractor is provided with a traveling vehicle body 103 steerably and drivably equipped with a right and left pair of front wheels 101 and drivably equipped with a right and left pair of rear wheels 102. A prime mover part 105 having an engine 104 is formed in a front portion of the traveling vehicle body 103. A driving part 108 having a driver's seat 106 and a steering wheel 107 for steering the front wheels 101 is formed in a rear portion of the traveling vehicle body 103. The driving part 108 is provided with a cabin 109 that covers an occupant space. A link mechanism 110 for coupling various types of work apparatuses such as a rotary tilling apparatus (not shown) to the tractor in a liftably operable manner and a power take-off apparatus 130 that takes off power from the engine 104 with a power take-off shaft 131 and outputs resultant power to the coupled work apparatus (apparatus to be driven) are provided in a rear portion of the traveling vehicle body 103. A vehicle body frame of the traveling vehicle body 103 is constituted by a transmission case 111 that is coupled at a front portion to a rear portion of the engine 104 and supports the rear wheels 102 and a front wheel support frame 112 that is coupled to a lower portion of the engine 104 and supports the front wheels 101.

Configuration of Power Transmission

Figure 9:
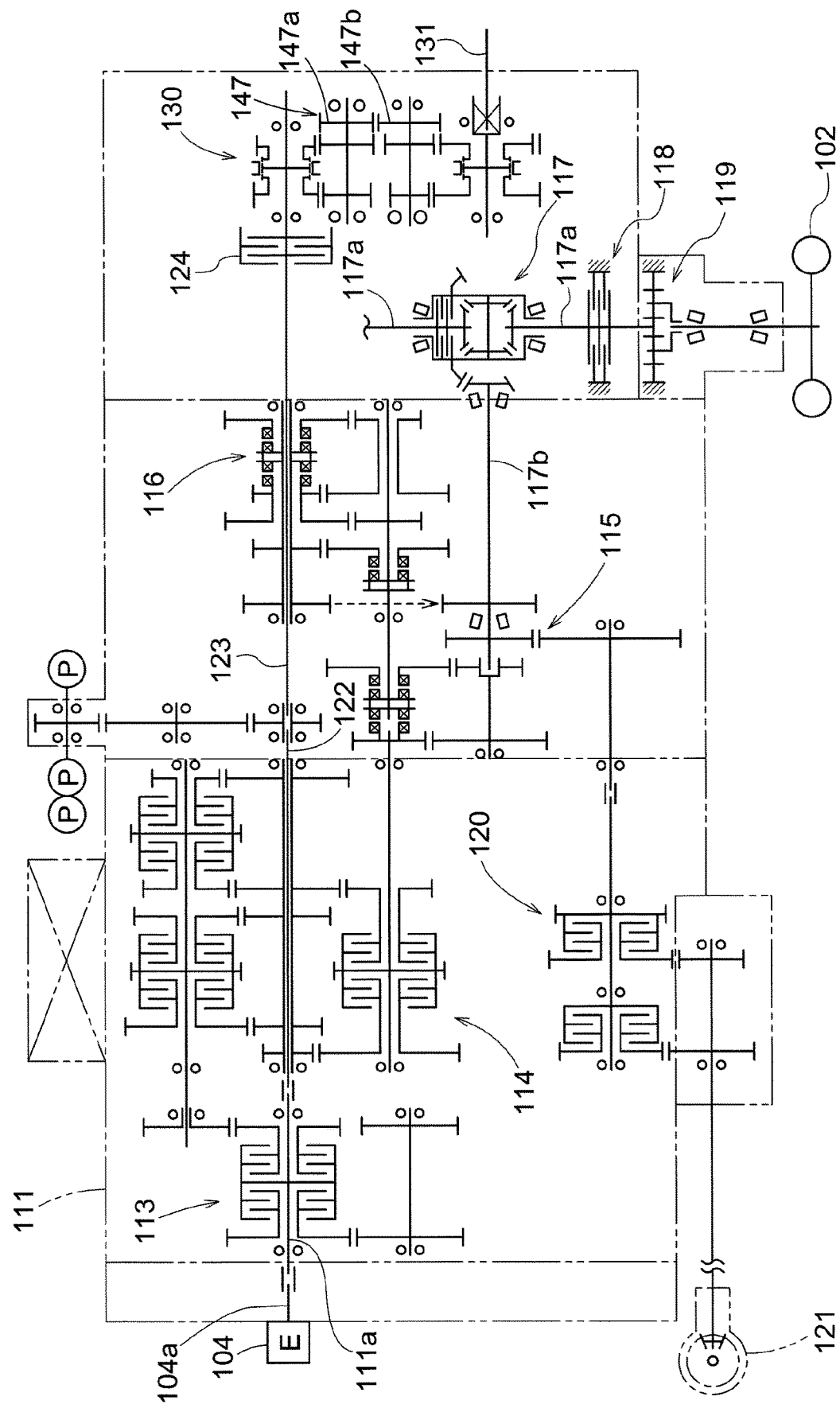
FIG. 9 is a diagram showing a power transmission structure.

The power of the engine 104 is transmitted to the front wheels 101, the rear wheels 102 and the power take-off shaft 131 based on the power transmission structure shown in FIG. 9.

That is, the power of an engine output shaft 104a of the engine 104 is transmitted to a transmission input shaft 111a of the transmission case 111. The power of the transmission input shaft 111a is input to a forward/reverse switching apparatus 113 and converted into forward power and reverse power. The forward power and reverse power obtained through conversion are input to an 8-speed main transmission apparatus 114 and undergo main transmission, and the forward power and reverse power that have undergone main transmission are input to a 2-speed creep transmission apparatus 115. The output of the creep transmission apparatus 115 is input to a 3-speed auxiliary transmission apparatus 116 and undergoes auxiliary transmission. The power obtained through auxiliary transmission is input to a rear wheel differential mechanism 117, and transmitted to the right and left rear wheels 102 from right and left output shafts 117a of the rear wheel differential mechanism 117. A handbrake 118 and a planetary reduction mechanism 119 are provided in the transmission system from the rear wheel differential mechanism 117 to the rear wheels 102. The power from the auxiliary transmission apparatus 116 is transmitted to a front wheel transmission apparatus 120 via the input shaft 117b of the rear wheel differential mechanism 117, is transmitted to a front wheel differential mechanism 121 from the front wheel transmission apparatus 120, and is transmitted to the right and left front wheels 101 from the front wheel differential mechanism 121. The front wheel transmission apparatus 120 is configured to be switchable between an OFF state, a uniform speed transmission state, and an acceleration transmission state. The front wheel transmission apparatus 120, when switched to the OFF state, cuts off output to the front wheel differential mechanism 121, and the tractor enters a two-wheel drive state in which only the rear wheels 102 are driven out of the front wheels 101 and the rear wheels 102. The front wheel transmission apparatus 120, when switched to the uniform speed transmission state, outputs the power from the input shaft 117b to the front wheel differential mechanism 121 in the uniform speed state, and the tractor enters a four-wheel drive state in which the front wheels 101 and the rear wheels 102 are driven in a state where the average circumferential speed of the right and left front wheels 101 is substantially equal the average circumferential speed of the right and left rear wheels 102. The front wheel transmission apparatus 120, when switched to the acceleration transmission state, upshifts the power from the input shaft 117b and outputs resultant power to the front wheel differential mechanism 121, and the tractor enters a four-wheel drive state in which the front wheels 101 and the rear wheels 102 are driven in a state where the average circumferential speed of the right and left front wheels 101 is faster than the average circumferential speed of the right and left rear wheels 102.

The power of the transmission input shaft 111a is transmitted to a work clutch 124 via a front rotation shaft 122 coupled at a front end portion to a rear end portion of the transmission input shaft 111a and a rear rotation shaft 123 coupled at a front end portion to a rear end portion of the front rotation shaft 122, and transmitted to the power take-off apparatus 130 from the work clutch 124.

Configuration of Power Take-Off Apparatus

Figure 10:
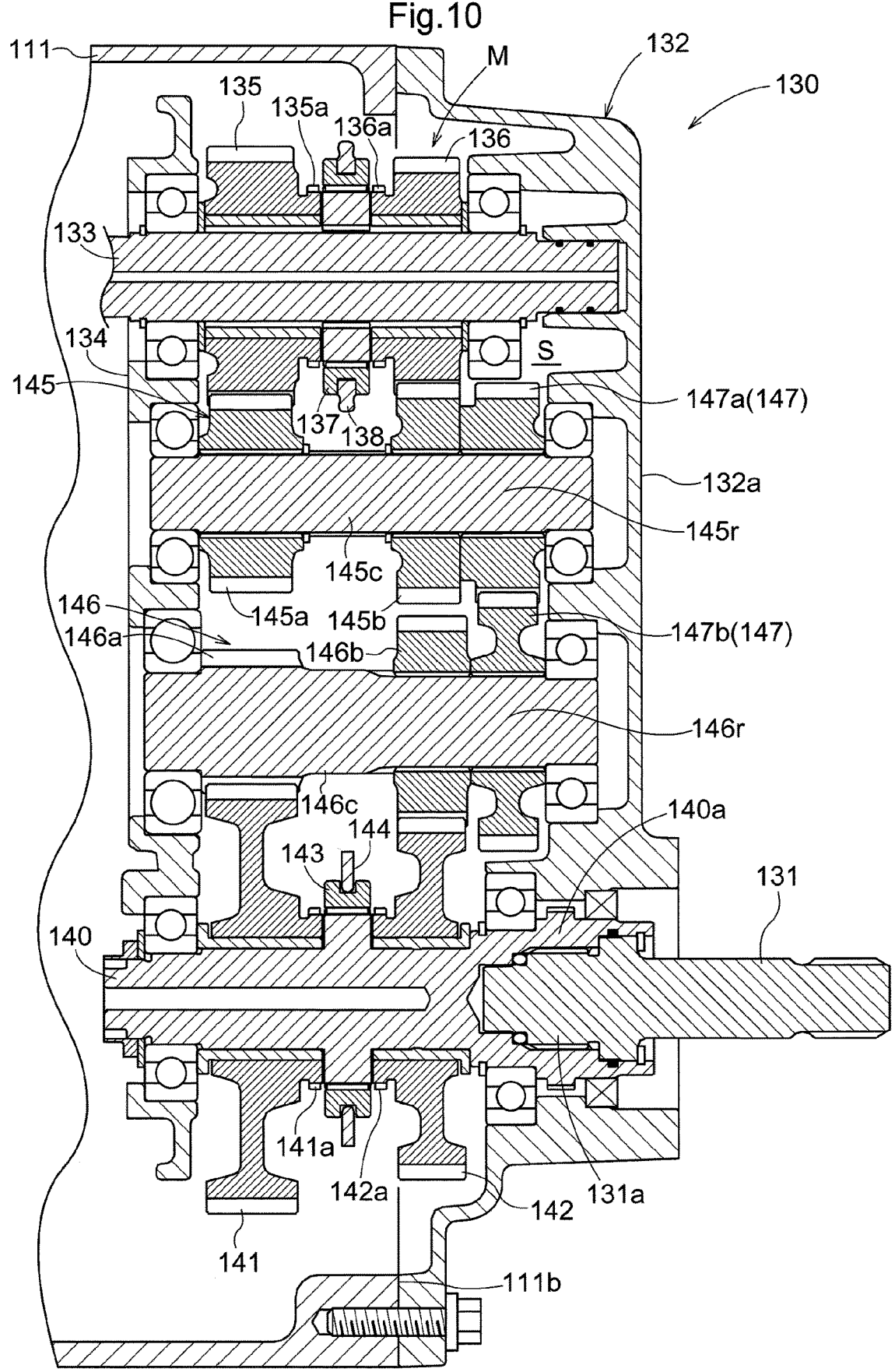
FIG. 10 is a view in section of the power take-off apparatus in an expanded state.
Figure 11:
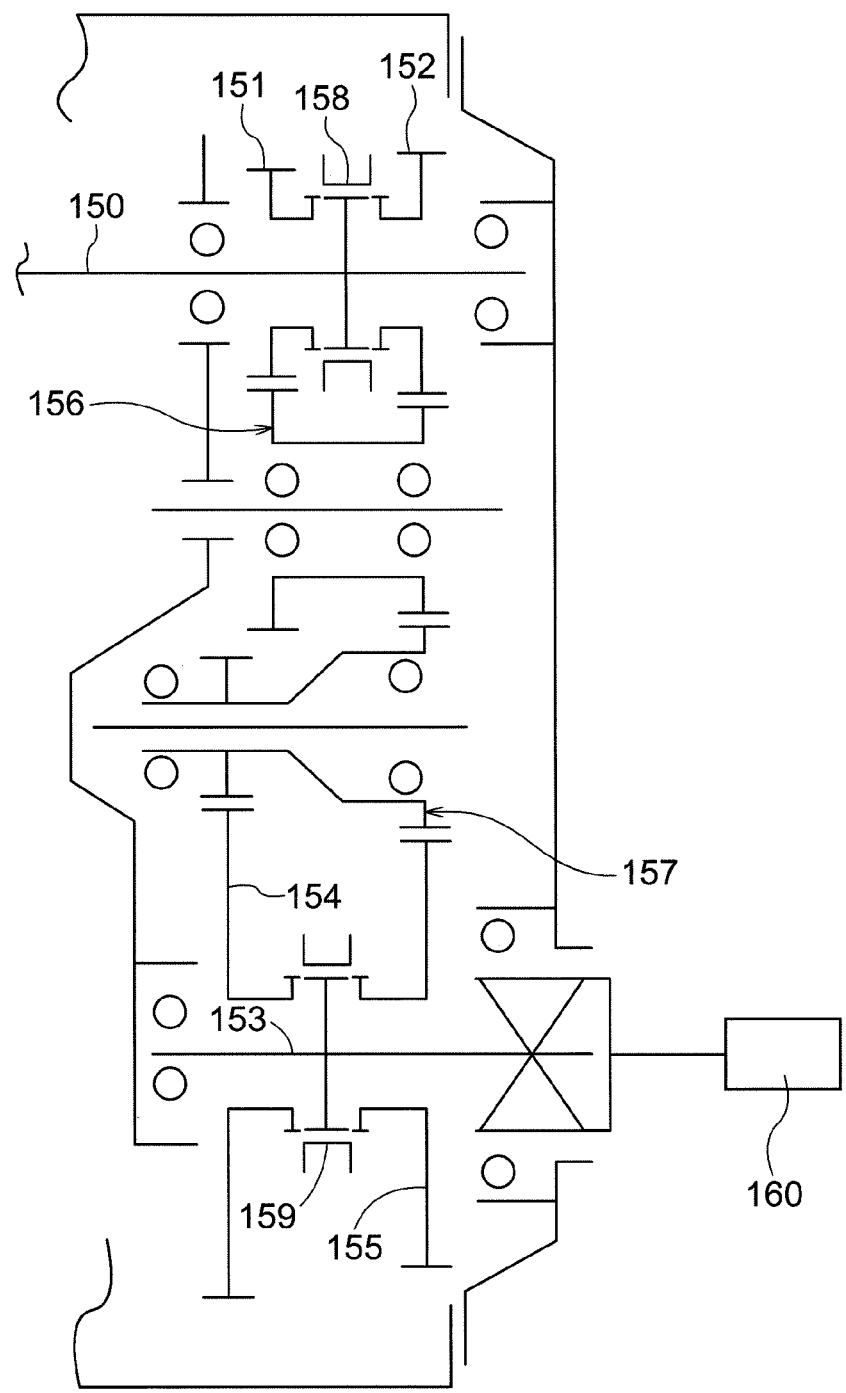
FIG. 11 is a diagram of a power take-off apparatus provided with a comparative structure.

The power take-off apparatus 130 is, as shown in FIG. 8, provided in a rear portion of the traveling vehicle body 103. The power take-off apparatus 130 is, as shown in FIG. 10, provided with a power take-off case 132 formed in a rear portion of the transmission case 111. The power take-off case 132 is constituted by the transmission case 111 and a gear case 132a removably attached to a rear wall part 111b of the transmission case 111 in a state of closing an opening formed in the rear wall part 111b. The power take-off shaft 131 protrudes rearward from a lower portion of the gear case 132a.

As shown in FIG. 10, an input shaft 133 is provided in an upper portion of an interior space S of the power take-off case 132 in a state of extending in the vehicle body longitudinal direction. The input shaft 133 is rotatably supported by the gear case 132a and a supporting wall part 134 located forward of the gear case 132a. The supporting wall part 134 is coupled to the gear case 132a via a coupling rod part (not shown) that extends rearward from a plurality of places of a peripheral portion of the supporting wall part 134, and is supported by the gear case 132a. A front portion of the input shaft 133 is coupled in an interlocked manner to an output member of the work clutch 124. The power of the transmission input shaft 111a, that is, the power of the engine 104, is transmitted to the input shaft 133.

A first input shaft gear 135 is relatively rotatably supported by the input shaft 133. A second input shaft gear 136 is relatively rotatably supported by the input shaft 133 on a rear side with respect to the first input shaft gear 135. The first input shaft gear 135 and the second input shaft gear 136 are configured such that the diameter of the first input shaft gear 135 differs from the diameter of the second input shaft gear 136. In the present embodiment, the diameter of the first input shaft gear 135 is configured to be larger than the diameter of the second input shaft gear 136.

An input shaft sleeve 137 is relatively rotatably and slidably supported by the input shaft 133, between the first input shaft gear 135 and the second input shaft gears 136. The input shaft sleeve 137 switches between a state of engaging a latch part 135a that is formed on a side portion of the first input shaft gear 135 and a state of engaging a latch part 136a that is formed on a side portion of the second input shaft gear 136, in response to the input shaft sleeve 137 being slidably operated by a first shift fork 138 that is engaging a peripheral portion of the input shaft sleeve 137. When the input shaft sleeve 137 engages the latch part 135a of the first input shaft gear 135, the first input shaft gear 135 is coupled in an interlocked manner to the input shaft 133, and when the input shaft sleeve 137 engages the latch part 136a of the second input shaft gear 136, the second input shaft gear 136 is coupled in an interlocked manner to the input shaft 133. The first input shaft gear 135 and the second input shaft gear 136 are alternatively coupled in an interlocked manner to the input shaft 133 by the input shaft sleeve 137.

An output shaft 140 that is parallel with the input shaft 133 is provided downward of the input shaft 133 in a state of extending in the vehicle body longitudinal direction. The output shaft 140 is rotatably supported by the gear case 132a and the supporting wall part 134. The output shaft 140 is coupled in an interlocked manner to the power take-off shaft 131 by spline engagement with a rear portion 140a of the output shaft 140 and a front portion 131a of the power take-off shaft 131. It is possible to take off the power of the output shaft 140 with the power take-off shaft 131.

A first output shaft gear 141 is relatively rotatably supported by the output shaft 140. A second output shaft gear 142 is relatively rotatably supported by the output shaft 140 on a rear side with respect to the first output shaft gear 141. The first output shaft gear 141 and the second output shaft gear 142 are configured such that the diameter of the first output shaft gear 141 differs from the diameter of the second output shaft gear 142. In the present embodiment, the diameter of the first output shaft gear 141 is configured to be larger than the diameter of the second output shaft gear 142.

An output shaft sleeve 143 is relatively rotatably and slidably supported by the output shaft 140, between the first output shaft gear 141 and the second output shaft gears 142. The output shaft sleeve 143 switches between a state of engaging a latch part 141*a* that is formed on a side portion of the first output shaft gear 141 and a state of engaging a latch part 142*a* that is formed on a side portion of the second output shaft gear 142, in response to the output shaft sleeve 143 being slidably operated by the second shift fork 144 that is engaging a peripheral portion of the output shaft sleeve 143. When the output shaft sleeve 143 engages the latch part 141*a* of the first output shaft gear 141, the first output shaft gear 141 is coupled in an interlocked manner to the output shaft 140, and when the output shaft sleeve 143 engages the latch part 142*a* of the second output shaft gear 142, the second output shaft gear 142 is coupled in an interlocked manner to the output shaft 140. The first output shaft gear 141 and the second output shaft gear 142 are alternatively coupled in an interlocked manner to the output shaft 140 by the output shaft sleeve 143.

A first relay transmission gear 145 and a second relay transmission gear 146 are provided between the input shaft 133 and the output shaft 140. The first relay transmission gear 145 has a first gear part 145*a* that engages the first input shaft gear 135, a second gear part 145*b* that engages the second input shaft gear 136, and a first relay shaft 145*c* that supports the first gear part 145*a* and the second gear part 145*b*. The first relay shaft 145*c* is engaged by spline engagement with the first gear part 145*a* and the second gear part 145*b*, and doubles as a coupling member that couples the first gear part 145*a* and the second gear part 145*b* in an interlocked manner. The first relay shaft 145*c* is rotatably supported by the gear case 132*a* and the supporting wall part 134 in a state of extending in the vehicle body longitudinal direction. The first gear part 145*a* and the second gear part 145*b* are configured such that the diameter of the first gear part 145*a* differs from the diameter of the second gear part 145*b*. In the present embodiment, the diameter of the first gear part 145*a* is configured to be smaller than the diameter of the second gear part 145*b*.

The second relay transmission gear 146 has a first gear part 146*a* that engages the first output shaft gear 141, a second gear part 146*b* that engages the second output shaft gear 142, and a second relay shaft 146*c* that supports the first gear part 146*a* and the second gear part 146*b*. The second relay shaft 146*c* is integrally formed with the first gear part 146*a*, engaged by spline engagement with the second gear part 146*b*, and doubles as a coupling member that couples the first gear part 146*a* and the second gear part 146*b* in an interlocked manner. The second relay shaft 146*c* is rotatably supported by the gear case 132*a* and the supporting wall part 134 in a state of extending in the vehicle body longitudinal direction. The first gear part 146*a* and the second gear part 146*b* are configured such that the diameter of the first gear part 146*a* differs from the diameter of the second gear part 146*b*. In the present embodiment, the diameter of the first gear part 146*a* is configured to be smaller than the diameter of the second gear part 146*b*.

The first relay transmission gear 145 and the second relay transmission gear 146 are coupled in an interlocked manner by a gear train 147 provided spanning a rear portion of the first relay transmission gear 145 and a rear portion of the second relay transmission gear 146. Specifically, as shown in FIG. 10, the gear train 147 is provided spanning a region 145*r* of the first relay shaft 145*c* that is located on the rear side with respect to the first gear part 145*a* and the second gear part 145*b* of the first relay transmission gear 145 and a region 146*r* of the second relay shaft 146*c* that is located on the rear side with respect to the first gear part 146*a* and the second gear part 146*b* of the second relay transmission gear 146. The gear train 147 can be removed rearwardly with respect to the first relay transmission gear 145 and the second relay transmission gear 146.

The gear train 147, as shown in FIG. 10, has only a first relay gear 147*a* that is coupled in an interlocked manner to the first relay transmission gear 145 and a second relay gear 147*b* that is coupled in an interlocked manner to the second relay transmission gear 146 in a state of engaging on the first relay gear 147*a*. The first relay gear 147*a* is coupled in an interlocked manner to the first relay shaft 145*c* by spline engagement, and is coupled in an interlocked manner to the first relay transmission gear 145. The first relay gear 147*a* and the first and second gear parts 145*a* and 145*b* of the first relay transmission gear 145 are supported by the same shaft, namely, the first relay shaft 145*c*. The second relay gear 147*b* is engaged by spline engagement with the second relay shaft 146*c*, and is coupled in an interlocked manner to the second relay transmission gear 146. The second relay gear 147*b* and the first and second gear parts 146*a* and 146*b* of the second relay transmission gear 146 are supported by the same shaft, namely, the second relay shaft 146*c*.

A gear shift mechanism M that shifts the power of the input shaft 133 to power having four different rotation speeds and transmits resultant power to the output shaft 140 is constituted by the first input shaft gear 135, the second input shaft gear 136, the input shaft sleeve 137, the first relay transmission gear 145, the gear train 147, the second relay transmission gear 146, the first output shaft gear 141, the second output shaft gear 142 and the output shaft sleeve 143.

In the power take-off apparatus 130, in response to the first input shaft gear 135 and the second input shaft gear 136 being alternatively coupled in an interlocked manner to the input shaft 133 by the input shaft sleeve 137, and the first output shaft gear 141 and the second output shaft gear 142 being alternatively coupled in an interlocked manner to the output shaft 140 by the output shaft sleeve 143, the gear shift mechanism M switches between a first transmission state, a second transmission state, a third transmission state and a fourth transmission state, and the rotation speed of the power take-off shaft 131 is changed through four steps.

That is, when the first input shaft gear 135 is coupled in an interlocked manner to the input shaft 133 by the input shaft sleeve 137 and the first output shaft gear 141 is coupled in an interlocked manner to the output shaft 140 by the output shaft sleeve 143, the gear shift mechanism M enters the first transmission state. When the gear shift mechanism M enters the first transmission state, the power of the input shaft 133 is transmitted to the output shaft 140 via the input shaft sleeve 137, the first input shaft gear 135, the first relay transmission gear 145, the gear train 147, the second relay transmission gear 146, the first output shaft gear 141 and the output shaft sleeve 143, and the power take-off shaft 131 is driven at a rotation speed that is set by the first transmission state.

When the first input shaft gear 135 is coupled in an interlocked manner to the input shaft 133 by the input shaft sleeve 137 and the second output shaft gear 142 is coupled in an interlocked manner to the output shaft 140 by the output shaft sleeve 143, the gear shift mechanism M enters the second transmission state. When the gear shift mechanism M enters the second transmission state, the power of the input shaft 133 is transmitted to the output shaft 140 via the input shaft sleeve 137, the first input shaft gear 135, the first relay transmission gear 145, the gear train 147, the second relay transmission gear 146, the second output shaft gear 142 and the output shaft sleeve 143, and the power take-off shaft 131 is driven at a rotation speed that is set by the second transmission state.

When the second input shaft gear 136 is coupled in an interlocked manner to the input shaft 133 by the input shaft sleeve 137 and the first output shaft gear 141 is coupled in an interlocked manner to the output shaft 140 by the output shaft sleeve 143, the gear shift mechanism M enters the third transmission state. When the gear shift mechanism M enters the third transmission state, the power of the input shaft 133 is transmitted to the output shaft 140 via the input shaft sleeve 137, the second input shaft gear 136, the first relay transmission gear 145, the gear train 147, the second relay transmission gear 146, the first output shaft gear 141 and the output shaft sleeve 143, and the power take-off shaft 131 is driven at a rotation speed that is set by the third transmission state.

When the second input shaft gear 136 is coupled in an interlocked manner to the input shaft 133 by the input shaft sleeve 137, and when the second output shaft gear 142 is coupled in an interlocked manner to the output shaft 140 by the output shaft sleeve 143, the gear shift mechanism M enters the fourth transmission state. When the gear shift mechanism M enters the fourth transmission state, the power of the input shaft 133 is transmitted to the output shaft 140 via the input shaft sleeve 137, the second input shaft gear 136, the first relay transmission gear 145, the gear train 147, the second relay transmission gear 146, the second output shaft gear 142 and the output shaft sleeve 143, and the power take-off shaft 131 is driven at a rotation speed that is set by the fourth transmission state.

Other Embodiments of the Second Embodiment (1) In the embodiment described above, the gear train 147 has only the first relay gear 147a and the second relay gear 147b, but these gear trains may have three or more relay gears.

(2) In the embodiment described above, the first relay gear 147a and the first and second gear parts 145a and 145b of the first relay transmission gear 145 are supported by the same first relay shaft 145c, and the second relay gear 147b and the first and second gear parts 146a and 146b of the second relay transmission gear 146 are supported by the same second relay shaft 146c, but the present invention is not limited thereto. For example, the first relay gear 147a and the first and second gear parts 145a and 145b of the first relay transmission gear 145 may be supported by separate shafts, and the second relay gear 147b and the first and second gear parts 146a and 146b of the second relay transmission gear 146 may be supported by separate shafts. Also, the first relay gear 147a and the first and second gear parts 145a and 145b of the first relay transmission gear 145 may be supported by the same first relay shaft 145c, and the second relay gear 147b and the first and second gear parts 146a and 146b of the second relay transmission gear 146 may be supported by separate shafts. Also, the second relay gear 147b and the first and second gear parts 146a and 146b of the second relay transmission gear 146 may be supported by the same second relay shaft 146c, and the first relay gear 147a and the first and second gear parts 145a and 145b of the first relay transmission gear 145 may be supported by separate shafts.

(3) In the embodiment described above, the gear train 147 is provided spanning the region 145r of a rear portion of the first relay shaft 145c and the region 146r of a rear portion of the second relay shaft 146c, but this gear train may be provided spanning a region of the first relay shaft 145c on a front side with respect to the first gear part 145a and the second gear part 145b and a region of the second relay shaft 146c on a front side with respect to the first gear part 146a and the second gear part 146b.

(4) In the embodiment described above, a configuration was adopted in which the first relay shaft 145c of the first relay transmission gear 145 doubles as a coupling shaft that couples the first gear part 145a and the second gear part 145b in an interlocked manner, and a configuration was adopted in which the second relay shaft 146c of the second relay transmission gear 146 doubles as a coupling shaft that couples the first gear part 146a and the second gear part 146b in an interlocked manner, but the present invention is not limited thereto. A configuration may be adopted in which, in the first relay transmission gear 145 (second relay transmission gear 146), the first gear part 145a (146a) and the second gear part 145b (146b) are provided in a state of being integrally formed or in a state of being coupled in an interlocked manner by a coupling member, and the first gear part 145a (146a) and the second gear part 145b (146b) are supported by dedicated shafts. In this case, the gear train 147 will not be coupled to the shafts of the first gear part 145a (146a) and the second gear part 145b (146b), but will be coupled in an interlocked manner to the member coupling the first gear part 145a (146a) and the second gear part 145b (146b).

What is claimed is:

1. A work vehicle comprising:
    a wheel differential mechanism having an output shaft and a differential case;
    an axle located on a vehicle body lateral outer side of the wheel differential mechanism and interlocked with the output shaft;
    a planetary reduction mechanism provided coaxial with and between the output shaft and the axle, and configured to downshift power of the output shaft and transmit resultant power to the axle;
    a brake configured to apply friction braking power to the axle via the output shaft, the brake having a friction plate latched to a region of the output shaft between the differential case and the planetary reduction mechanism; and
    a support member supporting the output shaft between the differential case and the planetary reduction mechanism, the support member being configured to engage the output shaft relative immovably in a direction along an axis of the output shaft, wherein
    the support member is a bearing that fits onto the output shaft, and the support member is positioned directly adjacent to the friction plate.

2. The work vehicle according to claim 1, wherein
the support member supports a region of the output shaft between the friction plate and the planetary reduction mechanism.

3. The work vehicle according to claim 1, wherein
the brake includes a friction plate receiving part supporting the friction plate pressed in the direction along the axis of the output shaft, and the bearing is supported by the friction plate receiving part.

\* \* \* \* \*